(12) United States Patent
Chauvin et al.

(10) Patent No.: US 11,568,549 B2
(45) Date of Patent: *Jan. 31, 2023

(54) METHOD AND SYSTEM FOR DETECTING PERIPHERAL DEVICE DISPLACEMENT

(71) Applicant: Logitech Europe S.A., Lausanne (CH)

(72) Inventors: Nicolas Chauvin, Chexbres (CH); Francois Morier, Romanel-sur-Lausanne (CH); Helmut Grabner, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,554

(22) Filed: May 27, 2021

(65) Prior Publication Data

US 2021/0287380 A1 Sep. 16, 2021

Related U.S. Application Data

(63) Continuation of application No. 16/054,903, filed on Aug. 3, 2018, now Pat. No. 11,042,992.

(51) Int. Cl.
*G06N 3/08* (2006.01)
*G06T 7/246* (2017.01)
(Continued)

(52) U.S. Cl.
CPC .......... *G06T 7/248* (2017.01); *G06F 3/03543* (2013.01); *G06K 9/623* (2013.01);
(Continued)

(58) Field of Classification Search
USPC .......... 382/107, 293; 345/163, 175
See application file for complete search history.

(56) References Cited

U.S. PATENT DOCUMENTS 11,042,992 B2 6/2021 Chauvin et al.
2005/0283307 A1* 12/2005 Siah ...................... G06F 3/0317
382/106
(Continued)

FOREIGN PATENT DOCUMENTS

CN 103105943 A 5/2013
CN 107818575 A 3/2018
(Continued)

OTHER PUBLICATIONS

Advisory Action for U.S. Appl. No. 16/054,903, dated Aug. 27, 2020, 3 pages.
(Continued)

*Primary Examiner* — Kiet M Doan
(74) *Attorney, Agent, or Firm* — Kilpatrick Townsend & Stockton LLP

(57) ABSTRACT

Methods and systems for determining a displacement of a peripheral device are provided. In one example, a peripheral device comprises: an image sensor, and a hardware processor configured to: control the image sensor to capture a first image of a surface when the peripheral device is at a first location on the surface, the first image comprising a feature of the first location of the surface; execute a trained machine learning model using data derived from the first image to estimate a displacement of the feature between the first image and a reference image captured at a second location of the surface; and determine a displacement of the peripheral device based on the estimated displacement of the feature.

19 Claims, 16 Drawing Sheets

(51) Int. Cl.
  *G06K 9/62* (2022.01)
  *G06F 3/0354* (2013.01)
  *G06N 20/00* (2019.01)
  *G06V 10/75* (2022.01)

(52) U.S. Cl.
  CPC .............. *G06N 3/08* (2013.01); *G06N 20/00* (2019.01); *G06V 10/751* (2022.01); *G06T 2207/20081* (2013.01)

(56) References Cited

U.S. PATENT DOCUMENTS

| | | | |
|---|---|---|---|
| 2006/0045314 A1* | 3/2006 | Gao | G01D 5/34776 382/106 |
| 2009/0247871 A1 | 10/2009 | Varghese et al. | |
| 2011/0141022 A1 | 6/2011 | Gordon et al. | |
| 2017/0195662 A1 | 7/2017 | Sommerlade et al. | |
| 2017/0337682 A1 | 11/2017 | Liao et al. | |
| 2018/0124425 A1 | 5/2018 | Van Leuven et al. | |
| 2018/0220589 A1 | 8/2018 | Burden | |
| 2020/0012346 A1 | 1/2020 | Schiff et al. | |

FOREIGN PATENT DOCUMENTS

| | | |
|---|---|---|
| DE | 10316208 A1 | 11/2003 |
| DE | 60221618 T2 | 9/2007 |

OTHER PUBLICATIONS

Final Office Action for U.S. Appl. No. 16/054,903, dated Apr. 21, 2020, 12 pages.
Non-Final Office Action for U.S. Appl. No. 16/054,903, dated Dec. 6, 2019, 12 pages.
Non-Final Office Action for U.S. Appl. No. 16/054,903, dated Sep. 28, 2020, 13 pages.
Notice of Allowance for U.S. Appl. No. 16/054,903, dated Feb. 17, 2021, 7 pages.
Notice of Decision to Grant for CN Application No. CN201910716974. 2, dated Apr. 13, 2022, 4 pages.
Office Action for CN Application No. CN201910716974.2, dated Feb. 7, 2022, 3 pages.
Office Action for CN Application No. CN201910716974.2, dated Sep. 17, 2021, 5 pages.
Office Action for DE Application No. DE102019120860.2, dated Apr. 8, 2022, 5 pages.

* cited by examiner

METHOD AND SYSTEM FOR DETECTING PERIPHERAL DEVICE DISPLACEMENT

CROSS-REFERENCE TO RELATED APPLICATIONS

The present application is a continuation of U.S. application Ser. No. 16/054,903, filed, on Aug. 3, 2018, entitled "METHOD AND SYSTEM FOR DETECTING PERIPHERAL DEVICE DISPLACEMENT," the entire content of which is herein incorporated by reference for all purposes.

BACKGROUND

Peripheral devices can be used to interface humans with computer. Some common peripheral devices include keyboards, computer mice, image scanners, speakers, microphones, web cameras, and more. Some of these peripheral devices can detect a motion as an input from a user, and translate the motion as an input to the computer. For example, a handheld peripheral device, such as a computer mouse, can detect its movement relative to a surface, and translate the movement relative to the surface into a corresponding movement of a cursor displayed in a graphical user interface (GUI). A user can move the computer mouse to control a location of the cursor, in order to interface with the computer via the GUI.

Given that a computer mouse translates a movement on a surface to a corresponding movement of a cursor in a display, which the user relies on when controlling the computer mouse, the precision at which the computer mouse detects its movement can be critical to user experience. For example, with a higher precision of movement detection, the computer mouse can respond to a user's input (in the form of movement of the computer mouse) more accurately, which enables the user to relate his/her movement of the computer mouse to the displayed location of the cursor with more certainty. This can improve the smoothness as well as the efficiency of the user's operations with the computer mouse. As a result, both productivity and user experience can be improved.

BRIEF SUMMARY

In some embodiments, a method is provided. The method comprises: capturing, from an image sensor at a first location on a surface, a first image of a surface, the first image comprising a feature of the first location of the surface; executing a trained machine learning model using data derived from the first image to estimate a displacement of the feature between the first image and a reference image captured at a second location of the surface; and determining a displacement of the image sensor based on the estimated displacement of the feature.

In some aspects, the image sensor is part of a computer mouse positioned on the surface. The displacement is to be provided to a computer to update content displayed by the computer. In some aspects, the data is derived from a subset of pixels of the first image.

In some aspects, executing the trained machine learning model using data derived from the first image comprises: providing pixel data of the first image to the trained machine learning model; and operating the trained machine learning model to perform: computing, based on the pixel data, a cross-correlation values distribution between the first image and the reference image, the cross-correlation values distribution corresponding to a set of candidate displacements; interpolating the set of candidate displacements based on the cross-correlation values distribution; and estimating the displacement based on a result of the interpolation.

In some aspects, executing the trained machine learning model using data derived from the first image comprises: generating a cross-correlation values distribution between the first image and the reference image, the cross-correlation values distribution corresponding to a set of coarse candidate displacements each having a pixel precision; providing the cross-correlation values distribution to the trained machine learning model; and operating the trained machine learning model to compute, based on the cross-correlation values distribution, a refined estimated displacement having a subpixel precision.

In some aspects, the method further comprises: selecting, from the set of coarse candidate displacements, a coarse candidate displacement corresponding to a peak cross-correlation value of the cross-correlation values distribution. The estimated displacement is generated based on the selected coarse estimated displacement and the refined estimated displacement.

In some aspects, the machine learning model comprises an artificial neural network. The artificial neural network comprises a fully-connected neural network, a convolutional neural network, or a combination of a fully-connected neural network and a convolutional neural network.

In some aspects, the method further comprises: selecting, based on an operation condition and from a plurality of machine learning models, a machine learning model to estimate the displacement of the feature. The data derived from the first image are provided to the selected machine learning model to generate the output. In some aspects, the operation condition comprises at least one of: a type of the surface, or a configuration of the image sensor.

In some aspects, the machine learning model is trained based on a training data set comprising: a set of reference images; a set of displacement images paired with the set of reference images; and a set of displacements of a feature between the set of reference images and the set of displacement images.

In some aspects, the machine learning model is trained based on a training data set comprising: a set of cross-correlation values between a set of reference images and a set of displacement images paired with the set of reference images; and a set of displacements of a feature between the set of reference images and the set of displacement images.

In some aspects, the refined displacement corresponds to an error displacement between an actual displacement and a coarse displacement obtained from the cross-correlation values distribution. The machine learning model is trained to minimize the error displacements output by the machine learning model for a training data set comprising a set of cross-correlation values distributions and a set of corresponding displacements.

In some embodiments, a peripheral device is provided. The peripheral device comprises an image sensor, and a hardware processor configured to: control the image sensor to capture a first image of a surface when the peripheral device is at a first location on the surface, the first image comprising a feature of the first location of the surface; execute a trained machine learning model using data derived from the first image to estimate a displacement of the feature between the first image and a reference image captured at a second location of the surface; and determine a displacement of the peripheral device based on the estimated displacement of the feature.

In some aspects, the peripheral device is a computer mouse. The displacement is to be provided to a computer to update content displayed by the computer.

In some aspects, the hardware processor is further configured to: provide pixel data of the first image to the trained machine learning model; and operate the trained machine learning model to perform: computing, based on the pixel data, a cross-correlation values distribution between the first image and the reference image, the cross-correlation values distribution corresponding to a set of candidate displacements; interpolating the set of candidate displacements based on the cross-correlation values distribution; and estimating the displacement based on a result of the interpolation.

In some aspects, the hardware processor is further configured to: generate a cross-correlation values distribution between the first image and the reference image, the cross-correlation values distribution corresponding to a set of coarse candidate displacements each having a pixel precision; provide the cross-correlation values distribution to the trained machine learning model; and operate the trained machine learning model to compute, based on the cross-correlation values distribution, a refined estimated displacement having a subpixel precision.

In some aspects, the hardware processor is further configured to: select, from the set of coarse candidate displacements, a coarse candidate displacement corresponding to a peak cross-correlation value of the cross-correlation values distribution. The estimated displacement is generated based on the selected coarse estimated displacement and the refined estimated displacement.

BRIEF DESCRIPTION OF THE DRAWINGS

The detailed description is set forth with reference to the accompanying figures.

DETAILED DESCRIPTION

Figure 1:
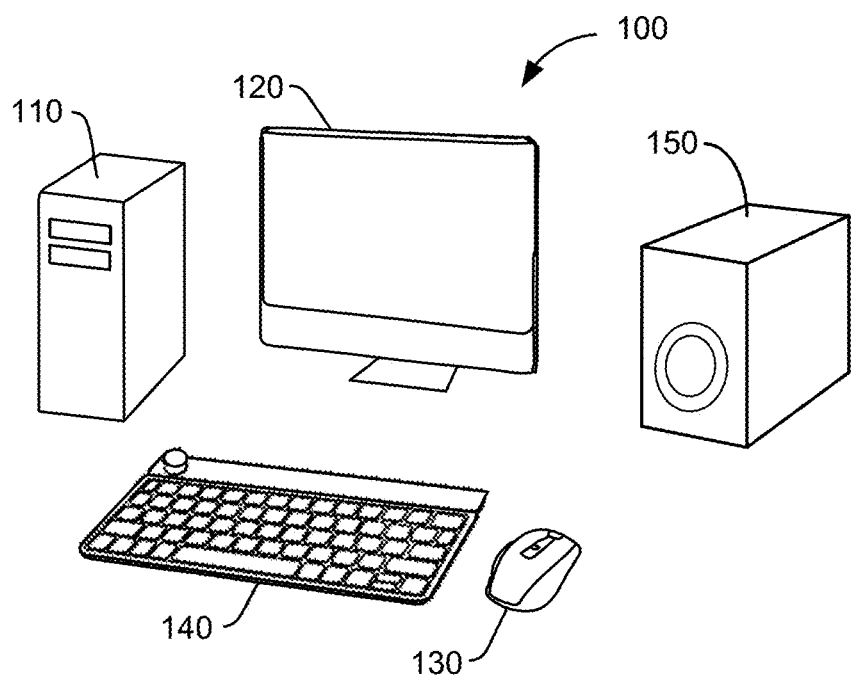
FIG. 1 shows a typical implementation for a system utilizing the disclosed techniques.

Aspects of the present disclosure relate generally to peripheral devices, and in particular to a wireless peripheral device controller, according to certain examples.

In the following description, various examples of a wireless peripheral device controller will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

A handheld peripheral device, such as a computer mouse, detects its motion on a surface and translates the detected motion to a corresponding motion of a cursor in a display. A handheld peripheral device may include a sensor to detect the motion. For example, a handheld peripheral device can include an optical sensor to, at different times, capture images of a surface on which the handheld peripheral device is placed. The surface may include certain features such as surface textures, a pattern of artifacts, etc., which can be tracked between images. A displacement of the feature (or part of the features, such as edge features) between the two images can be estimated, and the displacement between the images can be translated to an estimation of a physical displacement of the handheld peripheral device.

One way to estimate the displacement of the feature can be based on computation of cross-correlation values between the two images. For example, multiple cross-correlation values between one image and a shifted version of the image can be determined, with the multiple cross-correlation values corresponding to different shifting distances and along different shifting directions, and a distribution of cross-correlation values can be obtained. An image processor can compute the distribution of cross-correlation values, and provide an estimated displacement of the handheld peripheral device based on finding a combination of shifting distance and shifting direction that give rise to a peak cross-correlation value.

Although the above arrangements enable a computer mouse to provide a reasonably accurate and precise estimation of its displacement, the accuracy of the estimation can be limited by a number of factors. First, the surface may have a pattern of similar or identical features, and multiple peak cross-correlation values can occur for multiple combinations of shifting distances and shifting directions. The image processor may select the false peak cross-correlation values, which can lead to inaccurate estimation of the displacement. The effect of false peak cross-correlation values can be more prominent in cases where, for example, the optical sensor only captures a very small area of the surface, when the resolution of the images is very low, etc. In both cases, there may be insufficient image data to allow the image processor to distinguish between similar features when tracking the displacement of a particular feature between images.

Moreover, the precision of displacement estimation can also be limited by a distance between the pixel cells of the optical sensor. The limited precision can add discontinuity in the tracking of an otherwise continuous movement of the computer mouse. For example, as described above, a displacement can be estimated based on the relative pixel positions of an image feature between two images. The minimum displacement that can be resolved from the relative pixel positions may be no smaller than a separation between two pixel cells, and the image processor may be unable to resolve a displacement that falls between the two pixel cells. The limited precision can add errors to the estimation of displacement of the feature between images, which in turn can introduce discontinuity in the displayed movement of a cursor. The discontinuity can be especially perceptible when the cursor is moved continuously at a slow pace, which can degrade user experience.

One way to improve the accuracy and precision of displacement estimation is by increasing the resolution of the optical sensor. For example, more pixel cells can be included in an area to reduce the pixel distance and to improve precision. A larger pixel cell array can also be provided in the optical sensor to increase the size of the images captured by the optical sensor. By capturing larger images, more features (including repetitive and non-repetitive patterns) can be included in each image. Moreover, by increasing the resolution, non-repetitive patterns can be captured with sufficient details to enable the processor to distinguish from repetitive patterns. In both cases, the likelihood of the image processor providing inaccurate displacement estimation due to repetitive cross-correlation value distributions can be reduced. However, increasing the number of pixel cells in an optical sensor can lead to significant increase in power consumption and chip area, both of which are undesirable for a handheld device.

Conceptual Overview of Certain Embodiments

Examples of the present disclosure relate to a handheld peripheral device, such as a computer mouse. The handheld peripheral device can include an optical sensor and a hardware processor. The optical sensor can be configured to capture an input image of a surface. The handheld peripheral device can be placed on the surface when the optical sensor captures the input image. The surface may include a feature, and an image of the feature is included in the first image. The hardware processor can extract data related to the feature from the input image, and provide the data to a trained machine learning model to generate an output. The output represents an estimation of a displacement of the feature between the input image and a reference image comprising the feature. The reference image can be captured at a reference point on the surface. The hardware processor can determine, based on the output, a displacement of the handheld peripheral device between the acquisition time of the reference image and the acquisition time of the first image.

More specifically, the machine learning model can be trained based on a data set. The data set may include a set of images, including a set of displacement images and the reference image, of the surface (or other surfaces) captured by a training optical sensor (which can be part of another handheld peripheral device). The reference image can be captured by the training optical sensor at the reference location, whereas the set of displacement images can be captured by the training optical sensor at a set of predetermined displacement locations on the surface. For each displacement image, an actual physical displacement (between the reference location and the displacement location corresponding to the displacement image) and an image displacement of the feature (between the reference image and the displacement image) can be determined. The machine learning model can implement a function that accepts, for example, data related to the feature image displacement, and outputs an estimated physical displacement. A set of feature image displacements for the set of image pairs can be provided to the machine learning model. As part of the training process, the estimated physical displacements can be compared against the actual physical displacements to generate a set of differences (e.g., error displacements), and the parameters of the function can be iteratively updated to minimize the set of differences.

A handheld peripheral device controller according to the disclosed techniques can provide more accurate displacement estimation. For example, with a machine learning model, sub-pixel interpolation can be applied to the image locations of a feature to estimate a displacement at a sub-pixel precision which is higher than the raw precision of the optical sensor set by the pixel cell distance. Moreover, the machine learning model can be trained to cover a wide range of scenarios to become more robust. For example, the training process can be performed on a wide range of surfaces including various patterns of features. The training process can also be performed in cases where the aforementioned cross-correlation-based detection techniques are prone to errors (e.g., handling of repetitive (or near-repetitive) patterns). Further, the disclosed techniques can be implemented with little or no additional power consumption and negligible increase in chip area. For example, the machine learning model can be represented as software instructions and can be readily executed on a processor and stored in a storage. Unlike pixel cells, the machine learning model does not occupy a large chip area, while the execution of the machine learning model typically requires much less power than operating pixel cells. Accordingly, the improvements in the accuracy of displacement estimation based on machine learning model can be realized with much lower cost (in terms of power and chip area) than bringing about the same degree of improvements in the accuracy based on increasing the resolution of the optical sensor.

The machine learning model can be trained using different types of input data. For example, the machine learning model can be trained using pixel data of the images including the feature to provide the data related to the feature image displacement. In some examples, to reduce the size of the machine learning model and to speed up the processing, the machine learning model can be trained based on portions of the images including the features. For example, a region of interest in each image that includes the features can be identified, and pixel data of the region of interest from the two images, instead of the entirety of the images, can be used to train the machine learning model. In some examples, cross-correlation value distributions between two images can also be used to train the machine learning model.

Different techniques of using the machine learning model to perform displacement estimation are proposed. In some examples, the machine learning model can be trained to output the estimated displacement based on, for example, pixel data of a full image captured by the optical sensor, pixel data of a region of interest extracted from the full image, cross-correlation values distributions, etc. In some examples, the machine learning model can be trained and then used in a two-step process for displacement estimation. For example, the machine learning model can be trained to minimize a sub-pixel difference between an actual physical displacement and a coarse estimation of displacement (e.g., having a pixel-level precision), and the machine learning model can output the minimized sub-pixel difference. When performing displacement estimation, a coarse displacement can be estimated from, for example, pixel data (e.g., a full image, a region of interest, etc.), cross-correlation values distribution, etc. The same set of input data used for coarse estimation of displacement can be provided to the machine learning model to calculate a sub-pixel difference, and a full estimated displacement value can be obtained by combining the coarse displacement with the sub-pixel difference.

Different types of machine learning models can be used for displacement estimation including, a convolution neural network (CNN), a fully-connected neural network, etc. A machine learning model can include a set of weights obtained from the training process, with the set of weights representing the parameters of the function for displacement estimation. The machine learning model can be stored as a data structure including the set of weights. Multiple sets of weights of the machine learning model can be stored and can be organized based on various operation conditions including, for example, a type of the surface, configuration settings of the optical sensor, etc. A set of weights can then be selected based on the operation condition of the handheld peripheral device. The machine learning models can be stored either in the peripheral device, or in another device communicatively coupled with the peripheral device (e.g., a wireless dongle).

Typical System Environment for Certain Examples

FIG. 1 shows a typical implementation for a system 100 that can utilize the disclosed techniques. System 100 may include computer 110, display 120, and a plurality of peripheral devices including, for example, peripheral device 130 (e.g., "computer mouse 130"), peripheral device 140 (e.g., "keyboard 140"), and peripheral device 150 (e.g., "microphone 150"). For system 100, computer mouse 130, keyboard 140, and microphone 150 can be configured to control aspects of computer 110 and display 120, as would be understood by one of ordinary skill in the art. Computer 110 can be referred to as a "host computer" or a "host computing device." Each of peripheral devices 130-150 can include one or more sensors to sense an input action (or input signals, such as audio signals) provided by a user and generate corresponding sensor data (e.g., sensor data representing a distance of movement of computer mouse 130, sensor data indicating pressing of a key of keyboard 140, audio data collected by microphone 150, etc.). Peripheral devices 130-150 can provide the sensor data to computer 110 to control one or more operations of computer 110. For example, based on a movement detected by computer mouse 130, computer 110 can detect a selection of an audio file by the user in a graphical user interface displayed on display 120 and play the selected audio file.

Computer 110 may include a machine readable medium (not shown) that is configured to store computer code, such as keyboard driver software, and the like, where the computer code is executable by a processor of computer 110 to affect control of computer 110 by peripheral devices 130, 140, and/or 150. The various examples described herein generally refer to peripheral device 120 as a display, peripheral device 130 as a computer mouse, peripheral device 140 as a keyboard, and peripheral device 150 as a microphone, however it should be understood that peripheral devices 130-150 can be any input/output (I/O) device, user interface device, control device, input unit, or the like. For example, peripheral devices 130-150 can also be a remote control device, a wearable device (e.g., smart watch, wristband, glasses), a smart phone, or the like, and can provide input and output over a graphical user interface displayed in peripheral device 120. For example, peripheral device 130 can be moved on a surface and can estimate its displacement on the surface using the techniques to be described below. The displacement information can be provided to computer 110, which can update the location of a cursor displayed in the graphical user interface based on the displacement information.

The host computing device is typically described as a desktop or laptop computing device. However, it should be understood that the host computing device can be any suitable computing device further including a tablet computer, a smart phone, a virtual or augmented reality interface (e.g., having 2D or 3D displays), a holographic interface, or the like. One of ordinary skill in the art would understand the many variations, modifications, and alternative embodiments thereof.

Figure 2:
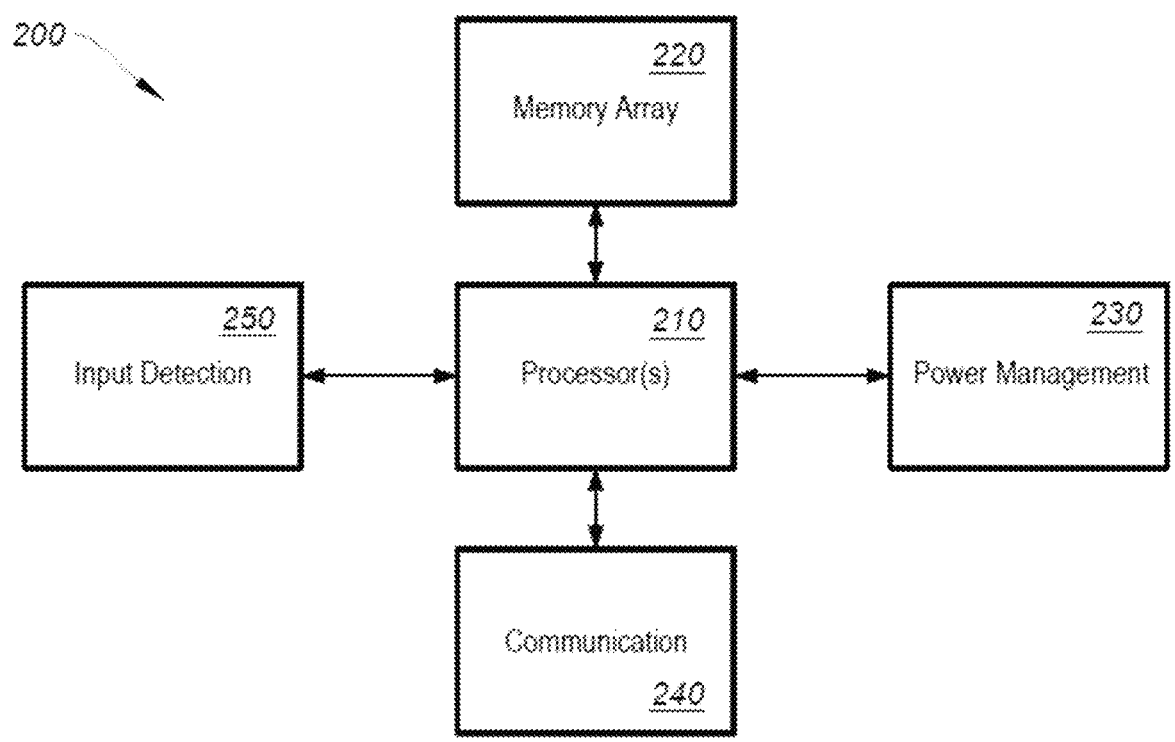
FIG. 2 shows a system for operating a peripheral device.

FIG. 2 shows a system for operating a peripheral device (e.g., one or more of peripheral devices 130-150), according to certain embodiments. System 200 includes processor(s) 210, memory array 220, power management system 230, communication system 240, and input detection module 250. Each of the system blocks 220-250 can be in electrical communication with the processor(s) 210 (e.g., via a bus system). System 200 may further include additional systems that are not shown or discussed to prevent obfuscation of the novel features described herein. System blocks 220-250 may be implemented as separate modules, or alternatively, more than one system block may be implemented in a single device. In some examples, system blocks 220-250 may be implemented on a peripheral device. In some examples, system blocks 220-250 may be implemented as a multi-device system including a peripheral device and a dongle. System blocks 220-250 can be configured to implement the techniques for displacement estimation to be described below.

In some examples, processor(s) 210 comprises one or more microprocessors (μCs) and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of peripheral devices 130-150 (e.g., system block 220-250). Alternatively or additionally, some of system blocks 220-250 may include an additional dedicated processor, which may work in conjunction with processor 210. One of ordinary skill in the art would understand the many variations, modifications, and alternative embodiments thereof.

Memory array 220 may be configured to store information pertaining to one or more operational configurations of peripheral devices 130-150. As further discussed below, one or more operational configurations of peripheral devices 130-150 may include setting performance characteristics of peripheral devices 130-150, including but not limited to, a computer mouse scroll speed, a sensitivity of computer mouse movement sensor, mapping of keyboard hot keys, microphone volume, etc., and the like. Memory array 220 may also store other configuration information used for communication with peripheral devices 130-150, as further discussed below.

Additionally, memory array 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs.

The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

Power management system 230 can be configured to manage power distribution, recharging, power efficiency, and the like, for peripheral devices 130-150. In some embodiments, power management system 230 can include a battery (not shown), a USB based recharging system for the battery (not shown), and power management devices (e.g., low-dropout voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH, NiCd), a corded power supply, a wireless power system (Qi®, Rezence™, Logitech POWERPLAY™), or other suitable examples. The recharging system can be an additional cable (specific for the recharging purpose) or it can use a USB connection to recharge the battery.

Communications system 240 can be configured to provide wireless and/or wired communication between, for example, processors 210 and one or more of peripheral devices 130-150. Communications system 240 can be configured to provide radio-frequency (RF), Bluetooth®, BLE, WiFi, infra-red (IR), ZigBee®, Logitech Unifying®, or other suitable communication technology to communicate with other computing devices and/or peripheral devices. Communications system 240 may also provide hardwired connection with processors 210. The hardwired connection can include a serial interconnect such as, for example, Universal Serial Bus (USB), FireWire®, DisplayPort®, etc.

Input detection module 250 can control the detection of a user-interaction with input elements on peripheral devices 130-150. For instance, input detection module 250 can detect user inputs based on sensor data from computer mouse 130. In some embodiments, input detection module 250 can work in conjunction with memory array 220 to generate input data to processors 210 based on the sensor data received from communication system 240. For example, based on scrolling speed information stored in memory array 220 as well as sensor data from computer mouse 130, input detection module 250 can calculate a distance traversed by a mouse pointer on display 120, and provide the distance information to processors 210 (or a renderer) to render the movement of the mouse on display 120.

Although certain systems may not expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Examples of the disclosed techniques can be realized in a variety of apparatuses including electronic devices implemented using any combination of circuitry and software. Furthermore, aspects and/or portions of system 200 may be combined with or operated by other sub-systems as required by design. For example, input detection module 250 and/or memory array 220 may operate within processor(s) 210 instead of functioning as a separate entity. In addition, the inventive concepts described herein can also be applied to various peripheral devices and not limited to computer mice, keyboards, or microphones. System 200 can be applied to any of the peripheral devices described in the embodiments herein, whether explicitly, referentially, or tacitly described (e.g., would have been known to be applicable to a particular peripheral device by one of ordinary skill in the art). The foregoing embodiments are not intended to be limiting and those of ordinary skill in the art with the benefit of this disclosure would appreciate the myriad applications and possibilities.

Examples of Displacement Estimation Techniques

Figure 3A:
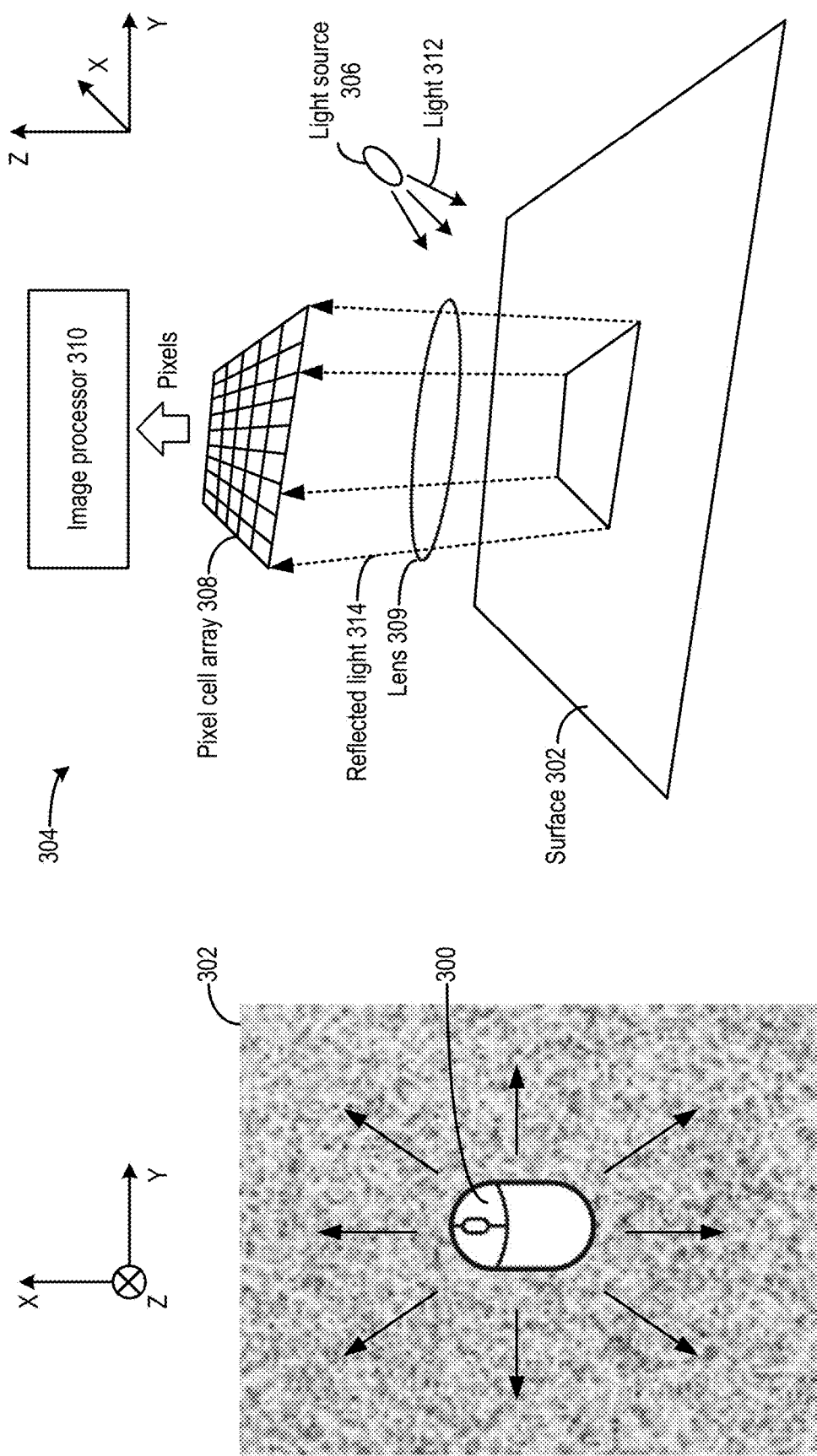
FIG. 3A-FIG. 3E illustrate an example of a handheld peripheral device 300 and its operations to control the display location of a cursor.

FIG. 3A-FIG. 3E illustrate an example of a handheld peripheral device 300 and its operations to control the display location of a cursor. Handheld peripheral device 300 may include a computer mouse (e.g., computer mouse 130 of FIG. 1) on a surface 302, which may include certain texture patterns, as shown in FIG. 3A. Handheld peripheral device 300 can be moved (e.g., by a human operator) on surface 302. As handheld peripheral device 300 is moved from one location to another location within a time period, handheld peripheral device 300 (and/or a dongle communicatively coupled with it) can provide an estimation for the displacement (including both the direction and the distance moved) of the peripheral device within the time period. The estimated displacement information can be provided to update the display location of a cursor.

In some examples, as shown in FIG. 3A, handheld peripheral device 300 includes an image system 304 including a light source 306, and an optical sensor comprising a pixel cell array 308, a lens 309, and an image processor 310. Image system 304 can be configured to provide information for displacement estimation. Light source 306 may include, for example, a light emitting diode (LED) to project light 312 onto surface 302. Lens 309 can be shifted up or down (along the Y-axis) to allow zooming in or out of surface 302, to control a focus as well as an area of imaging of surface 302. Pixel cell array 308 can receive light 314 reflected from surface 302 and can generate data representing images of surface 302. The images can be obtained when handheld peripheral device 300 is at different locations on surface 302. The images can be provided to image processor 310 for displacement estimation. To perform displacement estimation, image processor 310 can determine a change in the image location of one or more features of surface 302 (e.g., texture patterns) between two images. The change in the image location can reflect the displacement of pixel cell array 308 with respect to the one or more features. For example, the displacement of the feature between the two images can have the same distance but opposite direction from the displacement of handheld peripheral device 300.

One way to determine the image location change of the one or more features between two images can be based on, for example, a degree of correspondence between pixel data of the two images such as, for example, between images 320 and 322, between images 320 and 324, etc., each of which includes a feature 340. In some examples, the degree of correspondence can be based on a sum of absolute pixel value (or intensity) difference within a search window of the two images according to following equation:

$$R(x,y,x^*,y^*) = \Sigma_{i=x-M}^{x+M} \Sigma_{j=y-N}^{y+N} |\text{pixel\_320}(i,j) - \text{pixel\_322}(i+\Delta x, j+\Delta y)|$$ (Equation 1)

In Equation 1, R represents the sum of absolute pixel value difference between part of image 320 within a first search window centered at coordinates (x, y) and part of image 322 within a second search window centered at coordinates (x*, y*). The first search window and the second search window have the same dimension (same number of rows and same number of columns). For example, each of the first and second search window can have a width of 2M and a height of 2N around, respectively, coordinates (x, y) And coordinates (x*, y*). Coordinates (x*, y*) can be offset from coordinates (x, y) by a horizontal offset $\Delta x$ and by a vertical offset $\Delta y$. Further, pixel 320 and pixel 322 refer to the pixel values of, respectively, images 320 and 322 at pixel coordinates (i, j). An absolute difference can be determined between a pixel of image 320 at pixel coordinates (i, j) and a corresponding pixel of image 322 at the offset pixel coordinates (i+$\Delta x$, j+$\Delta y$). The process can be repeated for each pixel of image 320 within the first search window (defined by row boundaries x−M and x+M and column boundaries y−N and y+N) and the second search window (offset from the first search window by horizontal offset $\Delta x$ and by vertical offset $\Delta y$), and the absolute differences can be summed to calculate R.

In some examples, the degree of correspondence can be based on a normalized cross-correlation of pixel data of the two images, a normalized cross-correlation value of post-processed pixel data (e.g., post-processed using an edge detection filter, a Laplacian filter, a Gaussian filter, etc.) of the two images, or based on other digital image correlation (DIC) determinations. A normalized cross-correlation value between images 320 and 322 can be calculated according to following equation:

$$C = \frac{\sum_{x-M}^{x+M} \sum_{y-N}^{y+N} \text{pixel\_320}(i,j) \times \text{pixel\_322}(1+\Delta x, j+\Delta y)}{\sqrt{\sum_{x-M}^{x+M} \sum_{y-N}^{y+N} (\text{pixel\_320}(i,j))^2 \times \sum_{x-M}^{x+M} \sum_{y-N}^{y+N} (\text{pixel\_322}(i+\Delta x, j+\Delta y))^2}}$$ (Equation 2)

In Equation 2, C represents the normalized cross-correlation value between images 320 and 322. C can be determined based on dividing a sum of a product of corresponding pixel values of images 320 and 322 at each pixel coordinates by a square root of a product of a first sum of squares of pixel values of image 320 and a second sum of squares of pixel values of image 322.

Figure 3B:
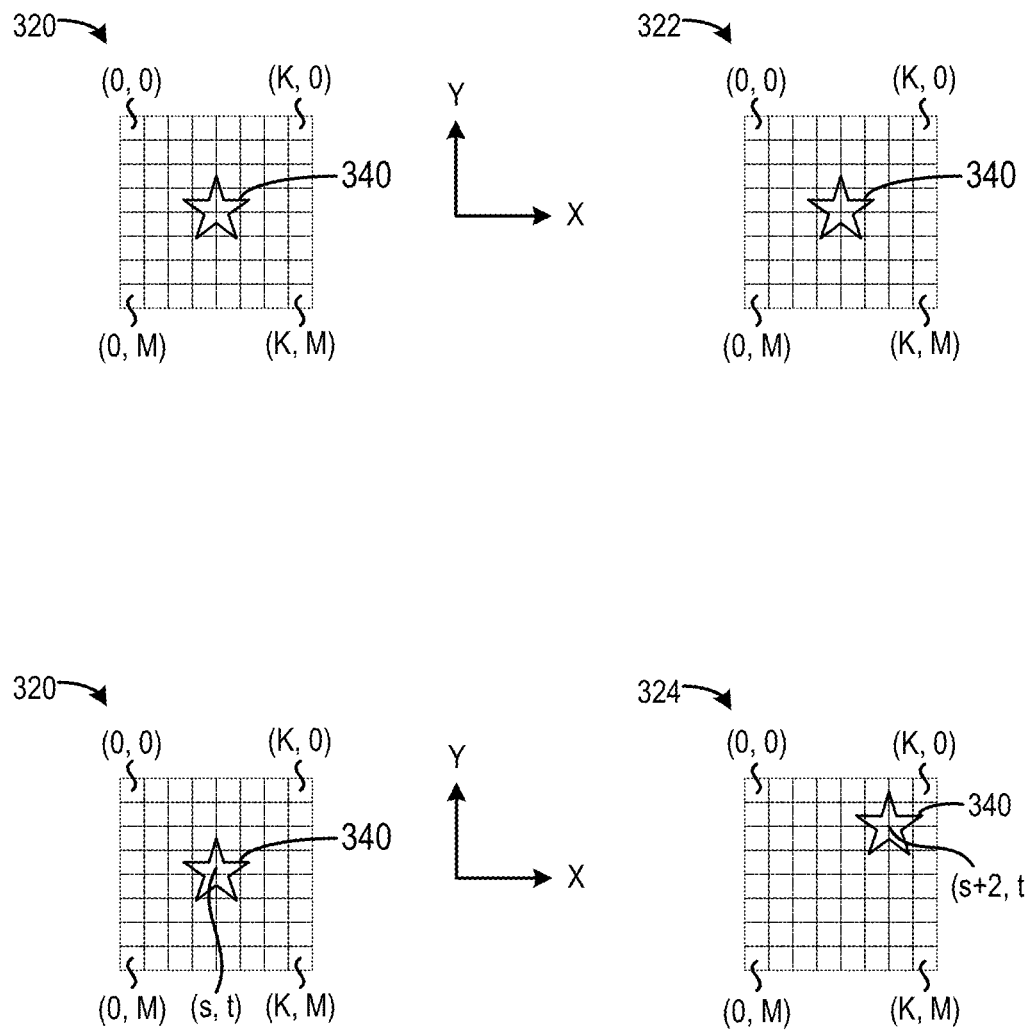

In the example of FIG. 3B, the degree of correspondence (e.g., based on a sum of absolute pixel value difference, a normalized cross-correlation, etc.) between images 320 and 322 can be at a peak value when feature 340 is perfectly aligned (e.g., having the same pixel coordinates) between images 320 and 322. On the other hand, the cross-correlation value between images 320 and 324 can be lower than the peak value due to feature 340 not aligned between the two images. The misalignment reflects a change in the image location of feature 340 between images 320 and 324, and the image location change can be measured for estimating a displacement of pixel cell array 308 (and handheld peripheral device 300).

In some examples, to determine the change in the image location of feature 340, image processor 310 can vary the horizontal offset $\Delta x$ and vertical offset $\Delta y$ to perform a search for feature 340 in image 324. The values of horizontal offset $\Delta x$ and vertical offset $\Delta y$ that give rise to the peak degree of correspondence (e.g., sum of absolute pixel value difference R, normalized cross-correlation value C, etc.) can indicate the change in the image location of feature 340 between image 322 and image 324. For example, as shown in FIG. 3B, a center of feature 340 is at image location (s, t) in image 320, whereas the center of feature 340 is at image location (s+2, t+2) in image 324. A peak sum of absolute pixel value difference R or a peak normalized cross-correlation value C can be obtained from Equations 1 and 2 with a horizontal offset $\Delta x$ of 2 and vertical offset $\Delta y$ of 2.

Figure 3C:
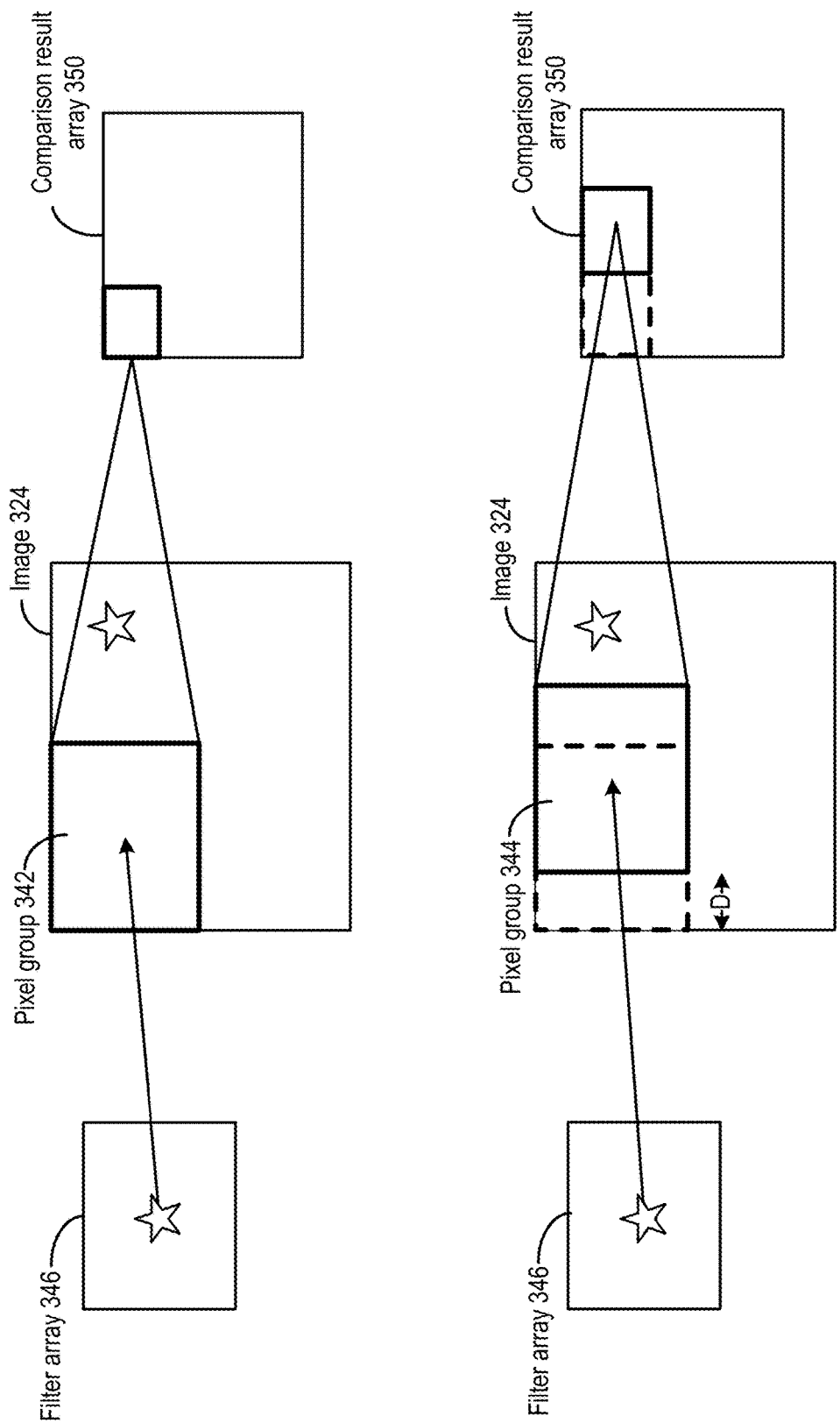

In some examples, a search operation for feature 340 can be performed by determining the sum of absolute pixel value difference R or normalized cross-correlation value C for different horizontal offsets $\Delta x$ and vertical offsets $\Delta y$. FIG. 3C illustrates an example of the search operation. As shown in FIG. 3E, image 324 (or image 320) can be divided into multiple overlapping pixel groups including, for example, pixel groups 342 and 344. Each pixel group can be centered at different pixel locations within image 324 and separated by, for example, a distance D. A filter array 346 comprising feature 340 can be compared with each of the pixel groups, and a comparison result array 350 can be generated based on the comparison results for each of the pixel groups. Various comparison schemes can be employed including, for example, determining a sum of absolute pixel value difference, determining a normalized cross-correlation, etc.

Figure 3D:
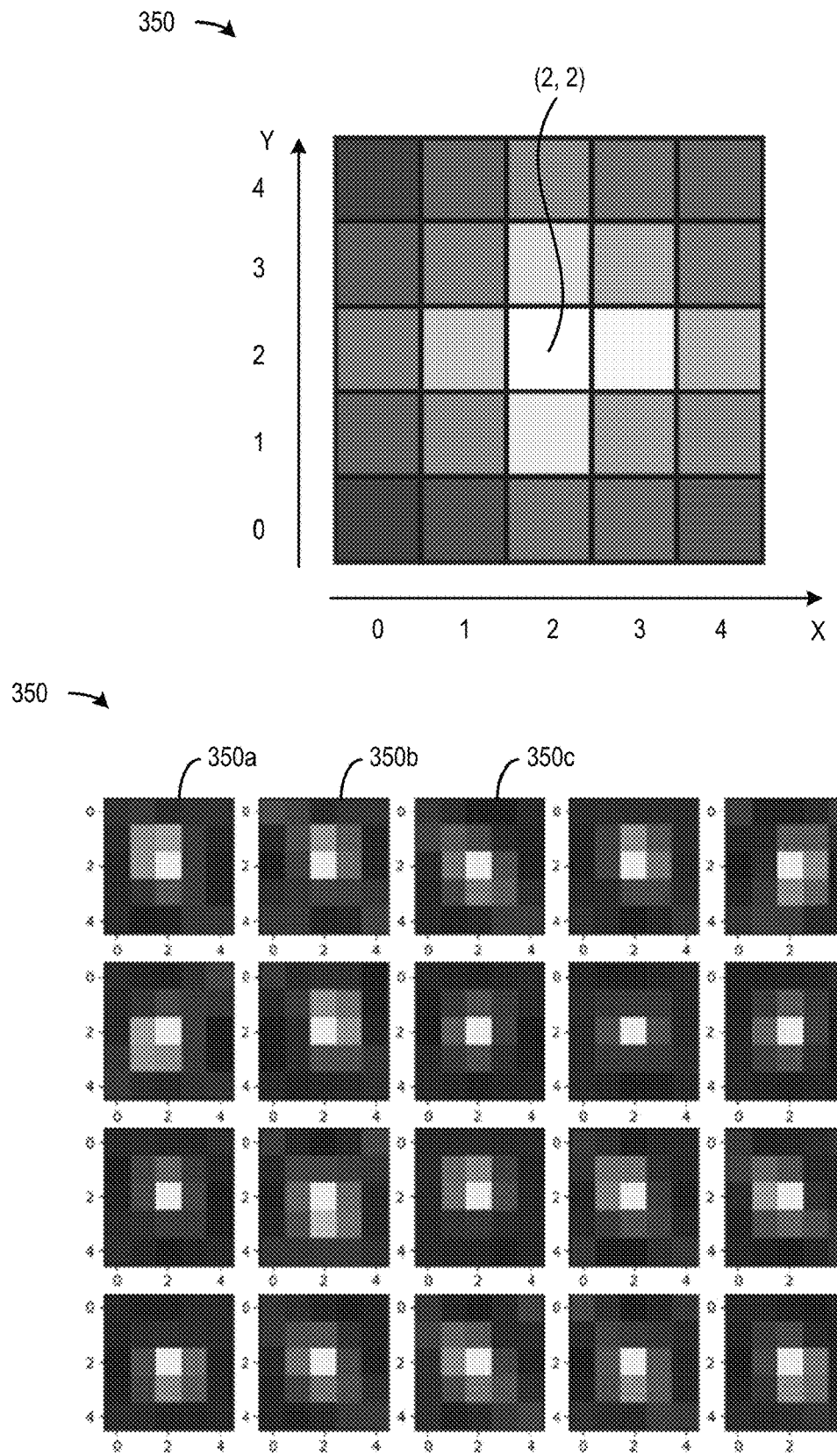
Figure 3E:
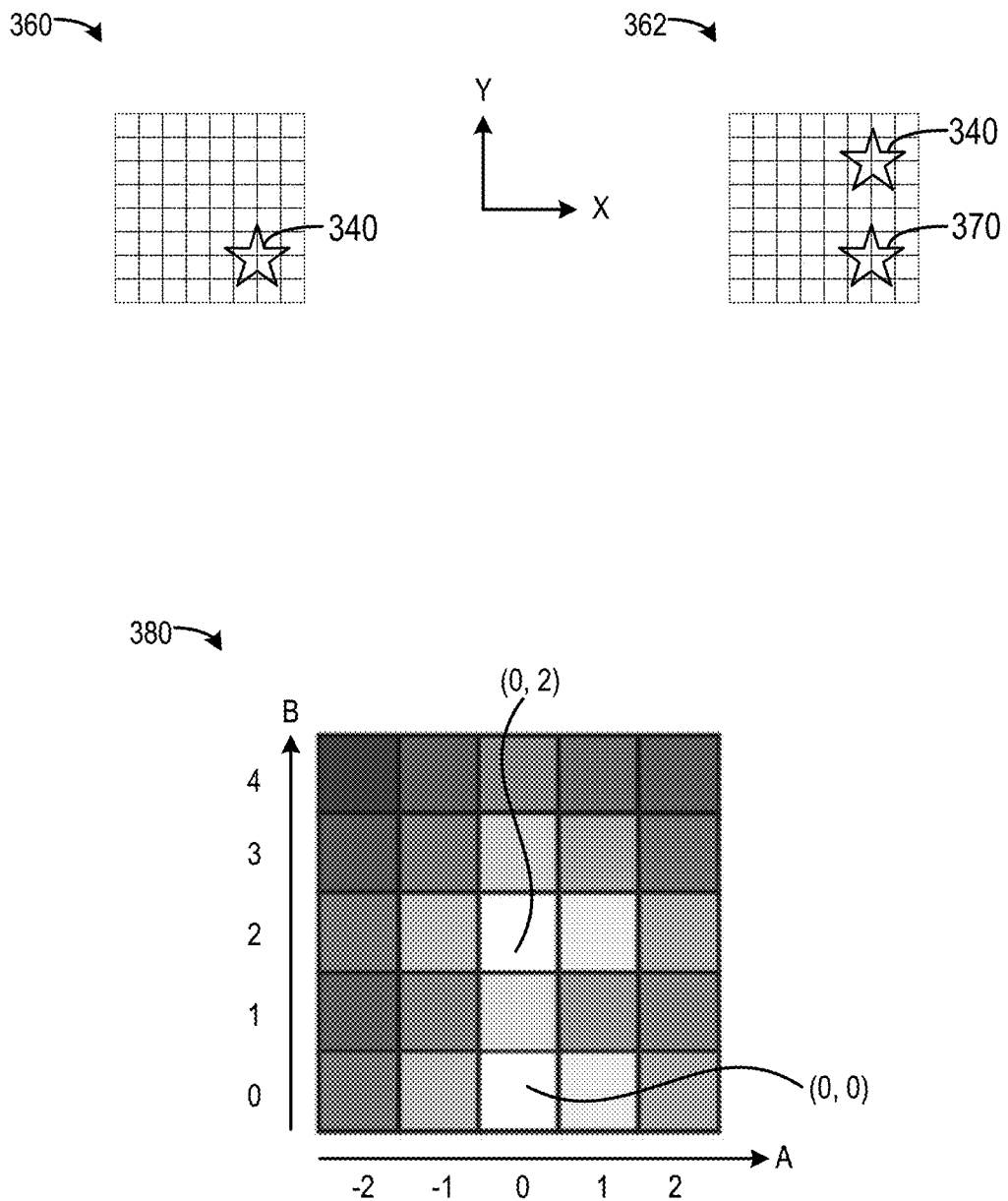

FIG. 3D illustrates examples of comparison result array 350. As shown in FIG. 3D, comparison result array 350 can store a distribution of comparison results with respect to different pixel locations of image 324. Each entry in comparison result array 350 stores a comparison result (e.g., a normalized cross-correlation value, a sum of absolute pixel value difference, etc.) between a pixel group and filter array 346, and each entry also corresponds to a pixel location (e.g., a center of the pixel group). Comparison result array 350 can provide, for example, a probability distribution of finding a feature at different pixel locations. For example, a pixel location being associated with a peak comparison result (e.g., having a peak cross-correlation value, a peak count of matching pixels, etc.) is most likely to be the image location of feature 340 in image 324. Referring to comparison result array 350 of FIG. 3D, image processor 310 can determine that feature 340 is likely to be at pixel coordinates (2, 2) of image 324 due to the peak comparison result being at pixel coordinates (2, 2). The image location of feature 340 in image 324 can be estimated based on identifying the peak values from each of the set of comparison result arrays 350. The estimation of the image location can then be used to estimate a displacement of the feature in that image with respect to a reference image. Multiple image pairs of image at a first location on a surface and reference image at a second location on the surface can be acquired by the image system 304. For each pair of first image and reference image, a comparison result array 350 can be computed. Multiple comparison arrays can produce a comparison result array dataset (350a, 350b, 350c) corresponding to a displacement dataset.

Although the above arrangements enable a computer mouse to provide a reasonably accurate and precise estimation of its displacement, the accuracy of the estimation can be limited by a number of factors. First, the surface may have a pattern of similar or identical features, and multiple peak cross-correlation values can occur for multiple distances and directions of shifting. The image processor may select the false peak cross-correlation values, which can lead to inaccurate estimation of the displacement. FIG. 3E illustrates an example scenario where false peak cross-correlation values may be generated. As shown in FIG. 3E, an image 360 includes feature 340, whereas an image 362 includes both feature 340 and another feature 370. Feature 370 may be identical or very similar to feature 340. The similarity between features 340 and 370 can be reflected in comparison results array 380, which shows two peak cross-correlation values at two different pixel shifting directions, one at (0, 0) and one at (0, 2), with the peak cross-correlation value at (0, 0) being a false peak. Image processor 310 may be unable to determine which of the peak cross-correlation values indicates the shifting of feature 340, or use the false peak for displacement estimation.

One way to improve the accuracy and precision of displacement estimation is by increasing the resolution of the optical sensor. For example, the size of pixel cell array 308 can be expanded to provide image data that covers a larger area of surface 302. Referring back to FIG. 3E, if image 360 captures a larger area of surface 302, image 360 may also include feature 370. The comparison results array 380 can then be generated based on shifting of both features 340 and 370 of image 362 with respect to image 360, and it is less likely to have two peak cross-correlation values. Moreover, the density of pixel cells in pixel cell array 308 can also be increased (e.g., by including more pixel cells in a unit area) to resolve features of smaller sizes, which very similar features (e.g., features 340 and 370) are to be distinguished from one another based on the cross-correlation values. The precision of image location change determination, as well as displacement estimation, can also be improved as well by reducing the distance between pixel cells. The improved precision can reduce the discontinuity in the tracking of an otherwise continuous movement of handheld peripheral device 300, which can also improve user experience.

Figure 4:
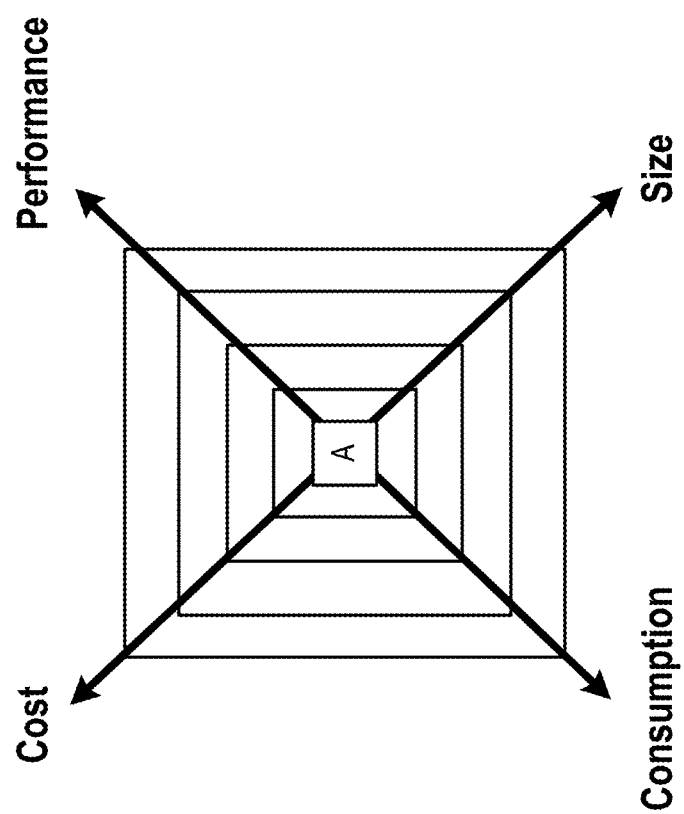
FIG. 4 illustrates an example chart that shows the relationship between the accuracy of displacement estimation and a set of metrics including chip size, power consumption, and cost, in a case where the accuracy is dictated by the resolution of an optical sensor.

However, increasing the resolution of an optical sensor can lead to significant increase in power consumption and chip area, both of which are undesirable for a handheld device. FIG. 4 illustrates an example chart 400 that shows the relationship between the accuracy of displacement estimation and a set of metrics including chip size, power consumption, and cost, in a case where the accuracy is dictated by the resolution of an optical sensor. As shown in FIG. 4, an increase in the accuracy, achieved by improving the resolution of the optical sensor, brings about a corresponding increase in chip size, power consumption, and cost. This can be attributed to the resolution of the optical sensor being directly related to the number of pixel cells. For example, each pixel cell consumes a finite amount of power. As the number of pixel cells is increased to improve the resolution, the total power consumed by the pixel cells also increases. Moreover, the volume of pixel data increases, which in turn requires more computing power at the image processor to process the pixel data. The larger computing power can also increases the power consumption at the image processor. Moreover, a size of the pixel cell array can also be increased to enable imaging of a larger area of the surface, to avoid the aforementioned false cross-correlation peak problem. Given that the size of the pixel cell array typically dominates the chip area, increasing the size of the pixel cell array also increases the chip area. Further, the cost of operating the peripheral device can also increase as a result of the increase in the power consumption and chip area.

Examples of Displacement Estimation Techniques Using Machine Learning

Figure 5:
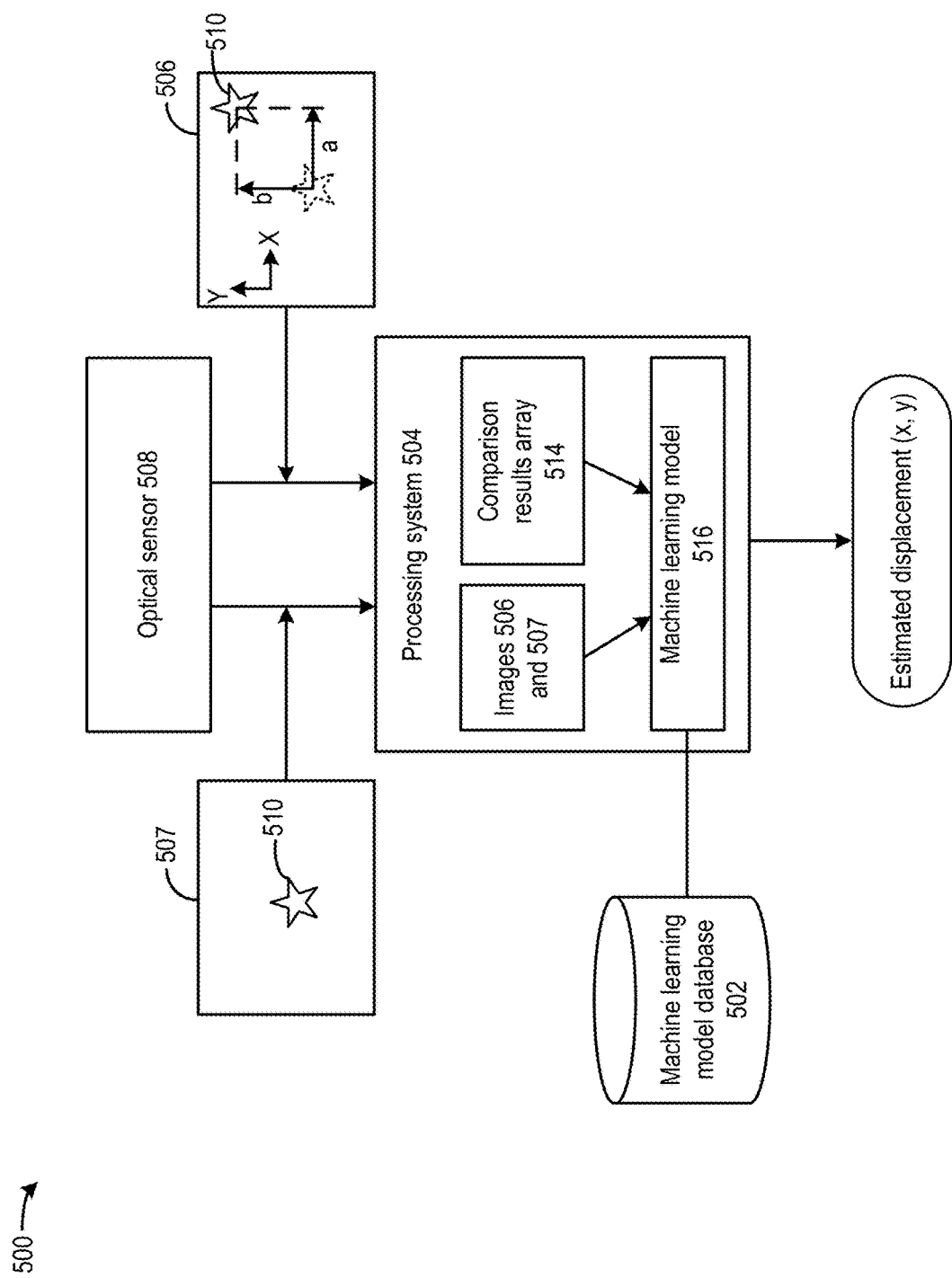
FIG. 5 illustrates an example of a displacement estimation system using techniques disclosed in the present disclosure.

To reduce the reliance on optical sensor resolution, a machine learning model can be employed to improve the accuracy of displacement estimation. Reference is now made to FIG. 5, which illustrates an example of a displacement estimation system 500. As shown in FIG. 5, displacement estimation system 500 may include a machine learning model database 502 and a processing system 504. Processing system 504 can receive a pair of images 506 and 507 from an optical sensor 508 (e.g., pixel cell array 308). Image 506 may include an image of feature 510 which is displaced from a position in image 507. In some examples, processing system 504 may also generate a comparison results array 514 including, for example, cross-correlation values or sum of absolute pixel value differences between different offsets between input images 506 and 507. Processing system 504 can also obtain a machine learning model 516 from machine learning model database 502, and apply the machine learning model to images 506 and 507 (or other data derived from images 506 and 507, such as comparison results arrays 514) to generate an estimated displacement of feature 510 between the two images. As to be described in more details below, the machine learning model may include a set of functions which can accept pixel data of input images comprising feature 510 (or other data derived from the input data) and compute an estimated displacement of feature 510 between the two input images. The machine learning model can be trained based on pairs of images of feature 510 and corresponding ground truth displacement between the locations of each pair of images. In some examples, the machine learning model can be in the form of an artificial neural network. The artificial neural network may include a plurality of processing nodes, with each processing node configured to process part of the input pixel data (or data derived from the input pixel data), or to further process the intermediate outputs from other processing nodes.

Figure 6:
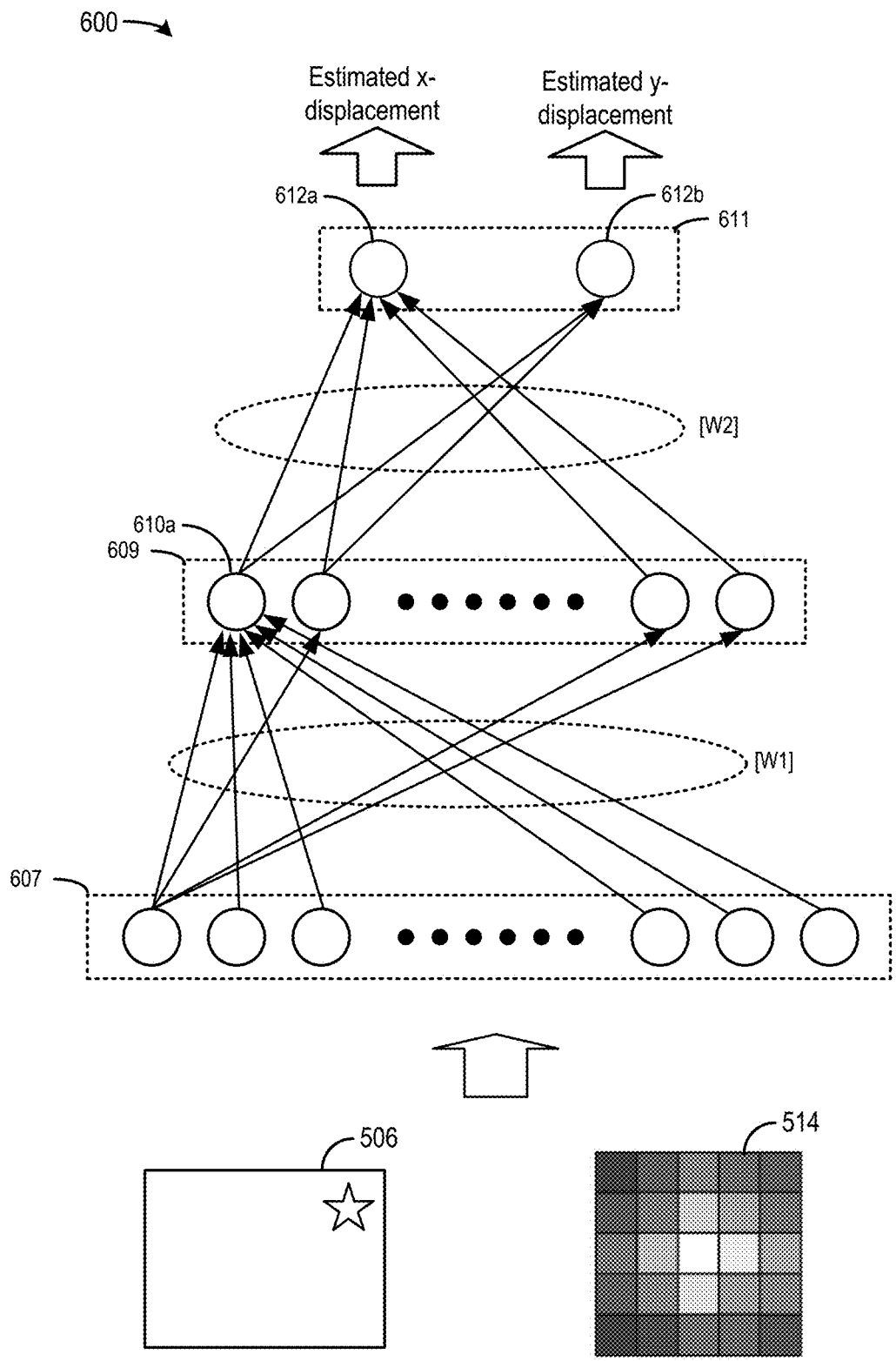
FIG. 6 and FIG. 7 illustrate examples of machine learning models that can be part of the displacement estimation system of FIG. 5.

FIG. 6 illustrates an example of a fully-connected deep-learning neural network 600 that can be used as part of machine learning model 516 of FIG. 5 for displacement estimation. As shown in FIG. 6, fully-connected deep-learning neural network 600 can be a multi-layer neural network and may include an input layer 607, one or more intermediate layers including intermediate layer 609, and an output layer 611.

Input layer 607 may process pixel data (or other derived data) representing different portions of an input image (e.g., input images 506 or 507). Each processing node of input layer 607 can be assigned to receive a pixel value corresponding to a pre-determined pixel within the input image. Each processing node of layer 607 can also be assigned a set of weights defined based on a matrix W1. Each processing node of layer 607 can multiply the pixel value with a weight to generate a product, and transmit the product to a processing node of intermediate layer 609.

Intermediate layer 609 may generate a set of intermediate outputs by, for example, summing the products received from each node of input layer 607. For example, assuming processing node 610a of layer 609 is connected to n processing nodes in input layer 607, processing node 610a may generate a sum of the scaled outputs received from layer 207 based on the following equation:

$$\text{sum}_{610a} = \Sigma_{i=0}^{n}(W1_i \times x_i) \quad \text{(Equation 3)}$$

Here, $\text{sum}_{610a}$ represents a sum generated by processing node 610a. $W1_i \times x_i$ represents a scaling of a particular pixel value with the associated weight (e.g., $W1_0$) by a processing node of input layer 607. With such arrangements, each processing node of layer 609 can compute a different sum based on a different set of weights (e.g., $W1_0$ for processing node 610a, $W1_i$ for processing node 610b, etc.) applied to each pixel of input image 506.

In some examples, the weight sets W1 can be determined based on a reference image (e.g., an image of certain features taken at a reference location), and the operations by input layer 607 and intermediate layer 609 can emulate the search of a best cross-correlation between input image 506 (or input image 507) with the reference image. The output layer 611 can sum weighted intermediate layer values to generate an estimated displacement representing an interpolation of the candidate displacements based on the associated cross-correlation values. As to be described in more details below, both weight sets W1 and W2 can be derived from a training processing to account for, for example, different feature patterns, corner cases, etc., to improve the confidence of finding the best cross-correlation match, and to reduce the error between the displacement estimation output and the actual displacement.

Figure 7:
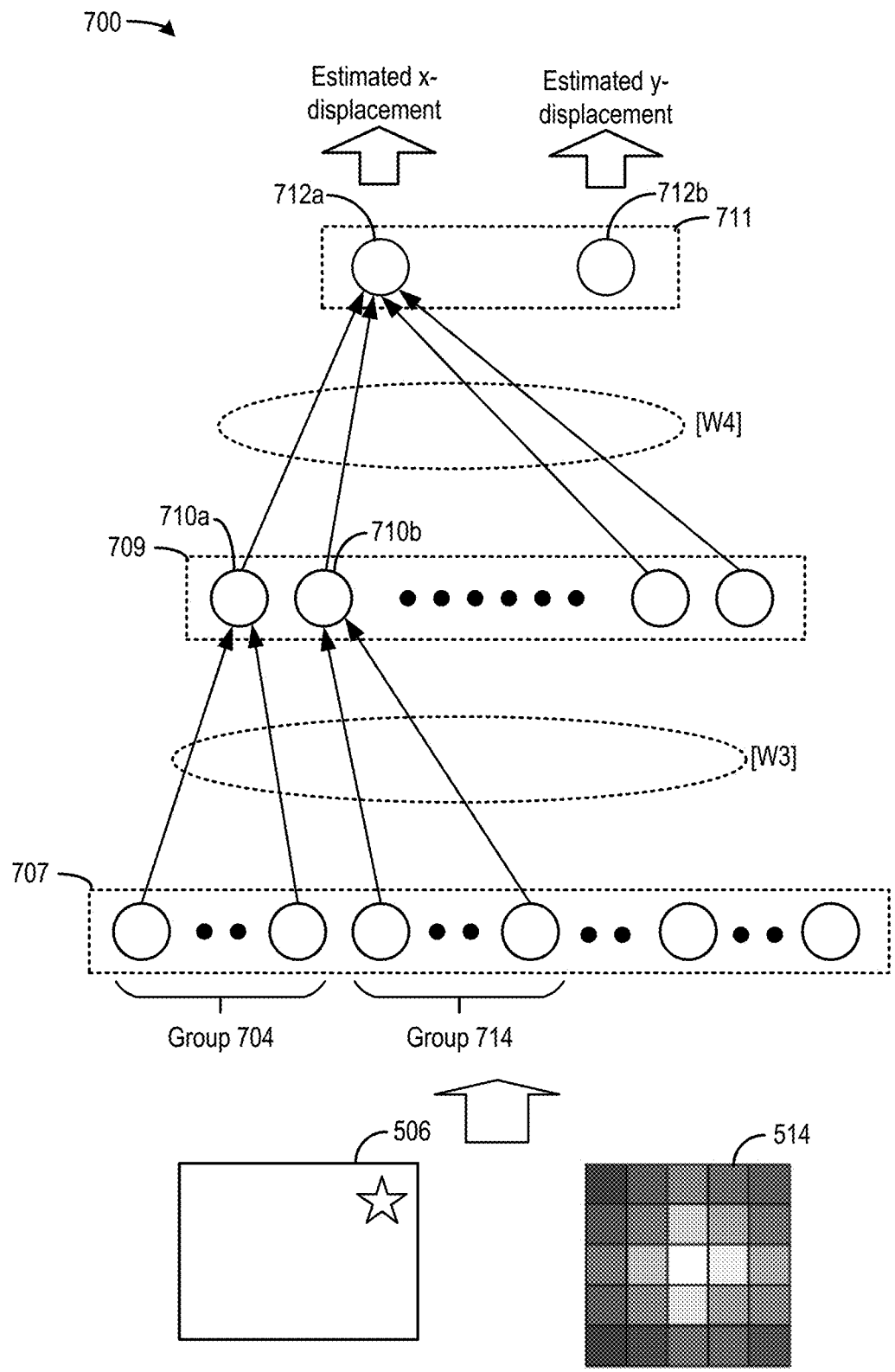

In some examples, a convolutional neural network can also be employed for displacement estimation. A convolutional neural network can be configured to perform, for example, search operations of one or more features in an input image as described in FIG. 3C. FIG. 7 illustrates an example of a convolutional neural network 700 that can be used as part of machine learning model 516 of FIG. 5 for displacement estimation. Convolutional neural network 700 can perform the search operations of FIG. 3C as part of the displacement estimation. As shown in FIG. 7, convolutional neural network 700 can be a multi-layer convolutional neural network including an input layer 707, one or more intermediate layers including intermediate layer 709, and an output layer 711.

Similar to input layer 607 of FIG. 6, input layer 707 may process pixel data (or other derived data) representing different portions of an input image (e.g., image 506). Each processing node of input layer 707 can be assigned to receive a pixel value corresponding to a pre-determined pixel within image 506. The processing nodes of input layer 707 can be grouped into pixel groups including, for example, pixel groups 342, 344, etc. Each pixel group can be assigned a set of weights W3 defined based on filter array 346. The processing nodes of a pixel group can, for example, multiply the pixel data with the weights W3 and transmit the scaled pixel data to a processing node in intermediate layer 709. For example, the processing nodes of pixel group 704 are connected to processing node 710a of intermediate layer 709, whereas the processing nodes of pixel group 714 are connected to processing node 710b of intermediate layer 709. Processing node 710a can sum the scaled pixel data from pixel group 342 to generate a correlation value, whereas processing node 710b can sum the scaled pixel data from pixel group 344 to generate another correlation value.

In addition, output layer 711 may include two processing nodes 712a and 712b, with processing node 712a configured to estimate a displacement along a first dimension (e.g., along an X-axis) and processing node 712b configured to estimate a displacement along a second dimension (e.g., along a Y-axis) based on the convolution values provided from intermediate layer 709. The estimation of the displacement can be based on scaling each convolution value with a weight from weight set W4 and summing the scaled convolution values. The weights W4 can be configured to enable each of processing nodes 712a and 712b to predict the displacement of feature 510 between the input image 506 and the reference image, based on a distribution of the convolution values. The weight sets W3 and W4 can also be derived from a training processing to account for, for example, different feature patterns, corner cases, etc., to reduce the error between the displacement estimation output and the actual displacement.

It is understood that the machine learning models of FIG. 6 and FIG. 7 are provided as examples only, and there are various other machine learning models that can be used for displacement estimation. For example, a neural network model comprising a combination of fully-connected neural network and convolutional neural network can be used, in which the blocks of processing nodes of the input layer are configured as spatial filters (similarly to input layer 707 of FIG. 7), whereas the intermediate layer is fully connected to the output layer. In addition, other models can also be used including, for example, support vector regression, linear regression, regression trees, etc.

In some examples, as described above, the machine learning models of FIG. 6 and FIG. 7 can also be trained to perform a two-stage displacement estimation based on comparison results array 514. As described above, comparison results array 514 can provide a probability distribution of finding a feature at different pixel locations of an image. The machine learning models of FIG. 6 and FIG. 7 can be trained using a set of reference comparison results arrays generated from pairs of images of known features of a surface taken at different locations, and corresponding ground truth displacement between the locations of each pair of images. The machine learning models can be trained to compare the set of reference comparisons results arrays with an input comparison results array to identify a feature represented in the input, and to compute a displacement of the feature. Such arrangements enable the machine learning models to focus the processing on the features for tracking displacement and less on pixel data that do not include the features, to improve efficiency.

Figure 8:
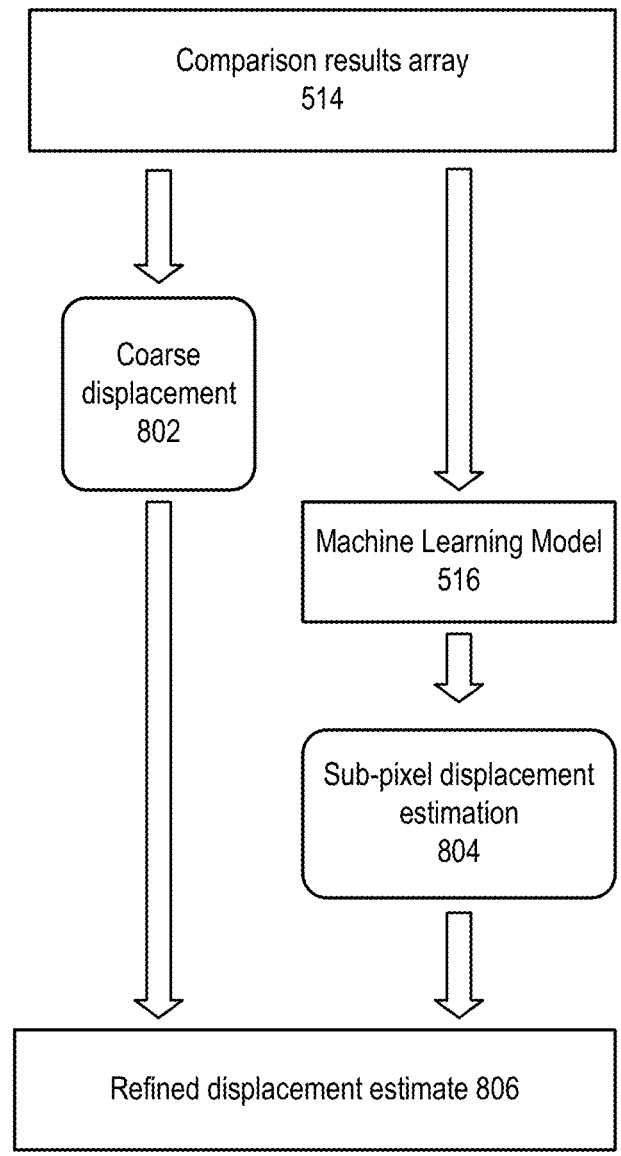
FIG. 8 illustrates another example of a displacement estimation system using techniques disclosed in the present disclosure.

An example of a two-stage displacement estimation is illustrated in FIG. 8. As shown in FIG. 8, a coarse displacement 802 with pixel-level precision can be obtained from comparison results array 514. As described above, comparison results array 514 can include a set of normalized cross-correlation values or sums of absolute pixel values differences between input images 506 and 507 with respect to different vertical and horizontal offsets between the two images. The vertical and horizontal offsets corresponding to the entry of comparison results array 514 that stores the peak comparison result can provide the coarse displacement 802 of feature 510 between input images 506 and 507. Coarse displacement 802 may have a pixel-level precision.

In addition, comparison results arrays 514 can be fed into machine learning model 516 as an input. As described above, the machine learning models can be trained using a set of reference comparison results arrays generated from images of known features of a surface taken paired with known displacements. The machine learning models can be trained to estimate the location of the peak comparison result with a subpixel precision and compute a subpixel-level displacement estimation 804 to improve the coarse displacement 802. Error displacement 804 can be added to coarse displacement 802 to generate a refined displacement estimate 806 having a subpixel-level precision.

Referring back to FIG. 6 and FIG. 7, a comparison results array 514 can be in the form of a matrix (e.g., a 5×5 matrix as shown). The matrix can have other dimensions including, for example, 3×3, 7×7, etc. A comparison results array 514 can be fed to the input layer (e.g., input layer 607 of FIG. 6, input layer 707 of FIG. 7, etc.), with each entry of the matrices mapped to a processing node of the input layer. In the case of a fully connected neural network 600 is used, each processing node of input layer 607 can scale the mapped entry with a set of weights to generate a set of scaled entry values, and transmit the scaled comparison results to intermediate layer 609. Intermediate layer 609 can generate a sum of the scaled comparison results from each processing node of the input layer (for FIG. 6), which can represent a sub-pixel level interpolation operation. In a case where convolutional neural network 700 is used, each group of processing nodes of input layer 707 (e.g., groups 704, 714, etc.) can be configured as a spatial filter. Each group of processing nodes can apply the spatial filter (represented by scaling with a set of weights) to a block of entries of comparison results array 514. The scaled block of entries values can be transmitted to intermediate layer 709, which can sum the values received from input layer 707 to perform a sub-pixel level interpolation. In both FIG. 6 and FIG. 7, the intermediate layer can further scale the sums and transmit the scaled sums to the output layer as intermediate outputs. The output layer can sum the intermediate outputs to generate, for example, an estimated displacement having sub-pixel resolution, an estimated error between the pixel-resolution displacement obtained from comparison results array 514 and the actual physical displacement, etc. In some examples, neural networks 600 and 700 can be configured to receive multiple comparison results arrays 514 generated from different search windows within the input images to further improve accuracy by, for example, reducing the likelihood of false matching of features as illustrated in FIG. 3E.

Figure 9A:
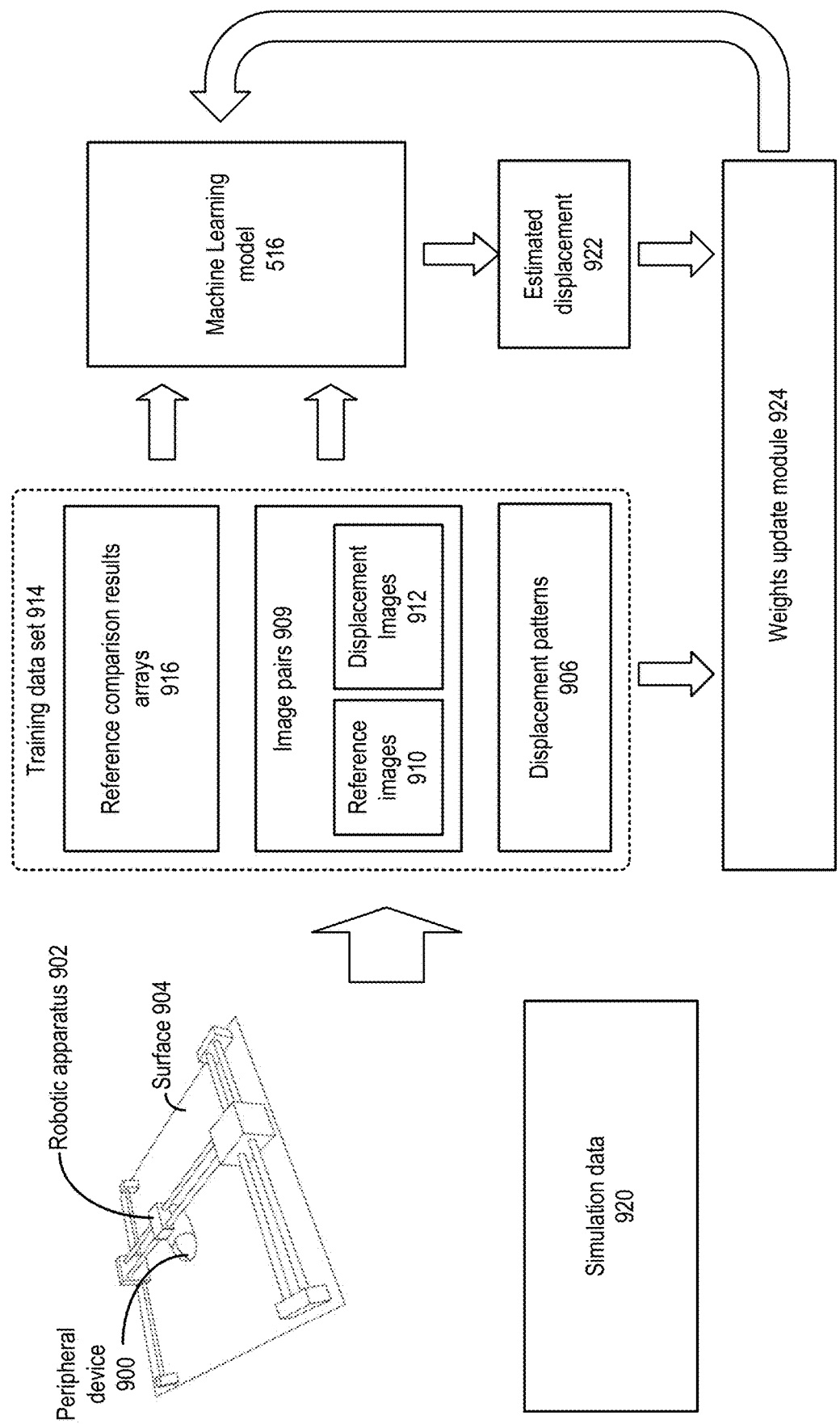
FIG. 9A and FIG. 9B illustrate examples of training and organizing the machine learning models used in the displacement estimation systems of FIG. 5 and FIG. 8.
Figure 9B:
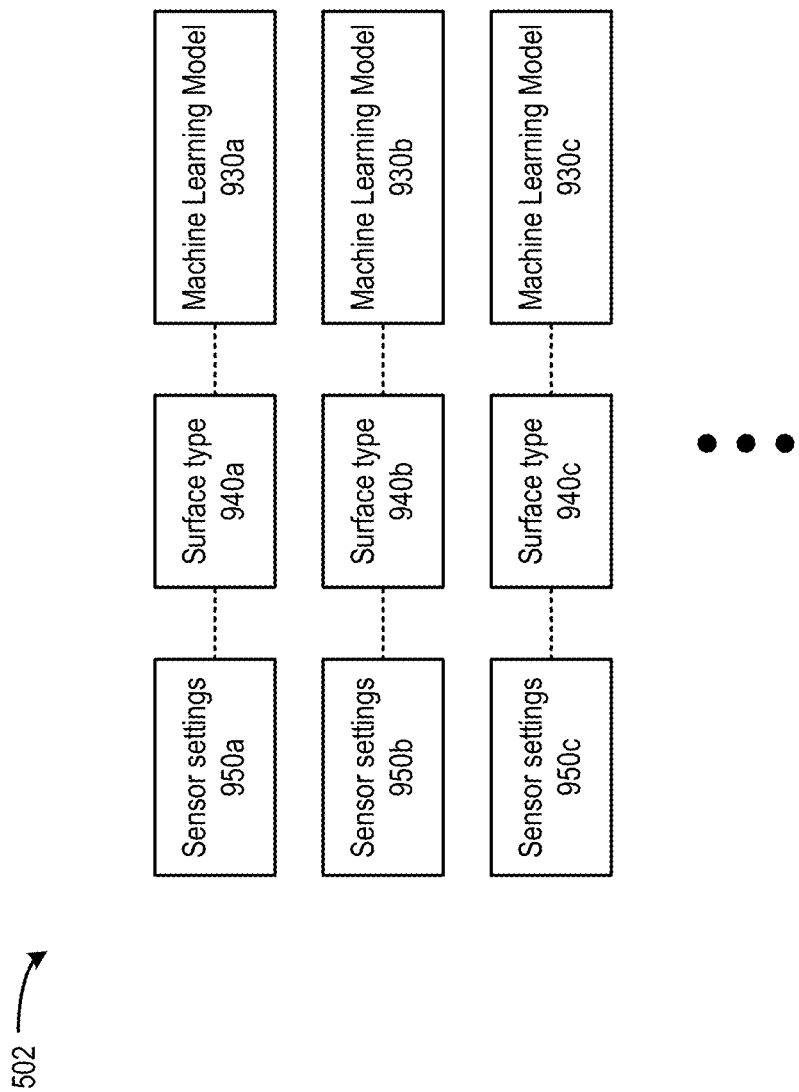

FIG. 9A and FIG. 9B illustrate examples of training and organizing machine learning models. In some examples, as shown in FIG. 9A, a peripheral device 900 can be moved by a robotic apparatus 902 on a surface 904 to generate a set of displacement patterns 906. The set of displacement patterns may include different combinations of displacement distances and displacement directions. Peripheral device 900 can also capture a set of image pairs 909 of surface 904, with each image pair including a reference image 910 and a displacement image 912 and being associated with a ground truth displacement (in terms of distance and direction) of a feature between the two images. Displacement patterns 906 can be designed such that the set of displacement images 912 includes corner cases images that are likely to lead to inaccurate displacement estimation, such as the example of FIG. 3D as described above. A training data set 914 can be created, in which each image of the set of displacement images 912 is paired with a displacement of displacement patterns 906. In some examples, a set of reference comparison results arrays 916 can be generated between pairs of reference images 910 and displacement images 912 using the techniques described above (e.g., as described in FIG. 3C-FIG. 3E), and training data set 914 can include reference comparison results arrays 916 being paired with the displacements patterns 906. A set of reference comparison results arrays 916 (similar to comparison results arrays 350a, 350b, 350c, etc.) can also be generated for each pair of reference images 910 and displacement images 912 for different optical sensor settings and can be used for training.

In some examples, instead of or in addition to creating an actual displacement pattern, simulation data 920 can also be used to generate training data set 914. For example, simulation data 920 can be generated by simulating the output response of optical sensor 508 at different locations on surface 904 and with different configurations (e.g., a configuration of magnifying power and imaging area based on lens 309, the dynamic ranges of pixel cell array 308, etc.). The output response can include images 909 and/or reference comparison results arrays 916 and which can be associated with displacement patterns 906 to form training data set 914.

Training data set 914 can be provided to train machine learning model 516. In a case where machine learning model 516 accepts pixel data as input, a reference image 910 can be used to generate an initial weight set. A displacement image 912 paired with the reference image can be fed into the model, which can output an estimated displacement 922. The estimated displacement 922 can be compared against the ground truth displacement associated with this particular pair of reference image and displacement image to generate a difference, and the weights can be adjusted to minimize the difference. The training can be repeated for multiple pairs of reference images 910 and displacement images 912 until, for example, a sum of the differences output by the model for each pair are minimized. In a case where machine learning model 516 accepts comparison results arrays 916 as input, a set of comparison results arrays 916 can be provided to the model to compute a set of displacements, which can be compared against a set of ground truth displacements associated with the set of comparison results arrays 916 to generate a set of differences. The weights can be updated iteratively as part of the training process to minimize a sum of the differences.

The aforementioned training process can be repeated to cover different operation conditions. For example, the training process can be repeated for different types of surfaces having different feature patterns, and for different optical sensor settings (e.g., different magnifying powers, imaging areas, resolutions, dynamic ranges, color filter settings, etc.). A database of machine learning models (e.g., machine learning model database 502 of FIG. 5) can be maintained. FIG. 9B illustrates an example organization of machine learning model database 502. As shown in FIG. 9B, machine learning model database 502 can include a plurality of machine learning models 930 (e.g., 930a, 930b, 930c, etc.). In a case where machine learning models 930 are multi-layer neural networks, each of the machine learning model can be represented by a set weights associated with different layers of the multi-layer neural networks. Each of machine learning models 930 can be associated with a surface type 940 (e.g., 940a, 940b, 940c, etc.) and an optical sensor setting 950 (e.g., 950a, 950b, 950c, etc.) which indicate the operation condition for training the associated machine learning model. To perform displacement estimation, processing system 504 can select one of machine learning models 930 based on an operation condition, and apply the selected model to the input data.

Figure 10:
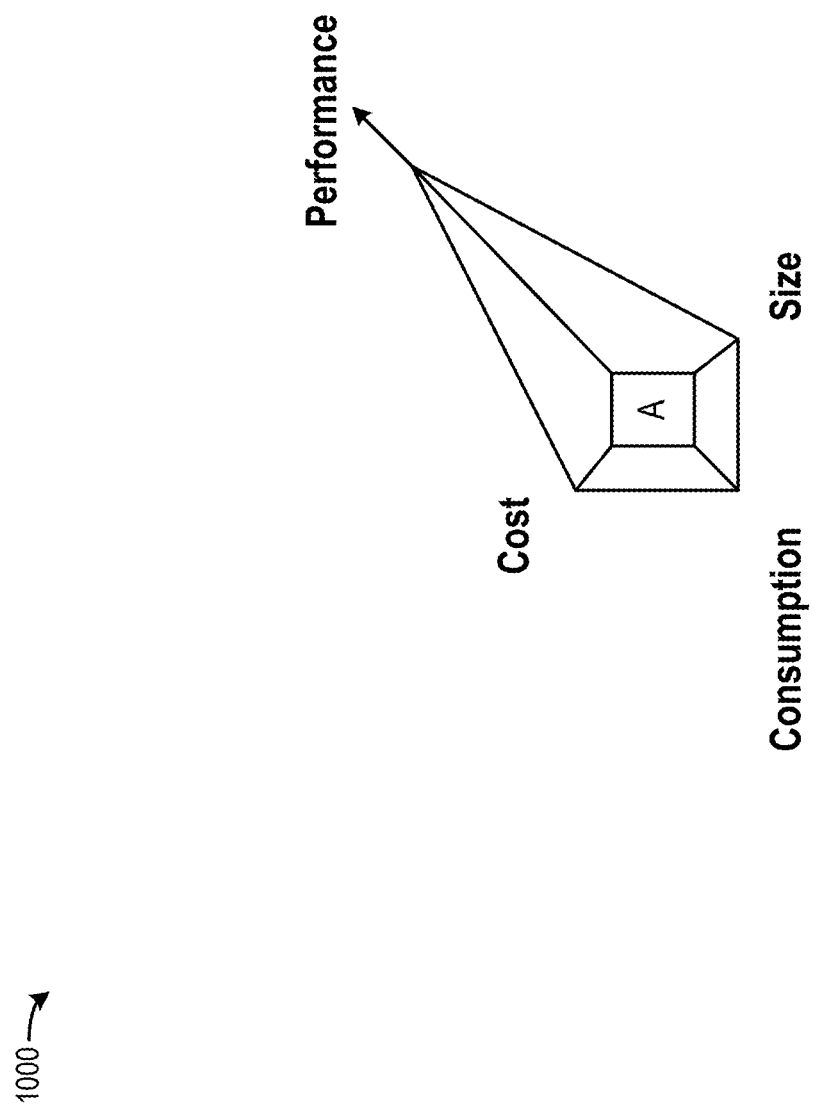
FIG. 10 illustrates an example chart that shows the relationship between the accuracy of displacement estimation and a set of metrics including chip size, power consumption, and cost in a case where the displacement estimation is performed using the disclosed techniques.

FIG. 10 illustrates an example chart 1000 that shows the relationship between the accuracy of displacement estimation and a set of metrics including chip size, power consumption, and cost when using the disclosed techniques to perform displacement estimation. Compared with chart 400 of FIG. 4, an increase in the accuracy can achieved by a much smaller increase in chip size, power consumption, and cost. This can be attributed to, for example, the accuracy being improved using machine learning techniques, and the accuracy does not rely solely on the resolution of the optical sensor. While a more complex machine learning model and/or a larger volume of input data may be needed to further improve the accuracy, the increase in the required computing power (and power consumption) is much less than the case where additional pixel cells are added and additional computing power is needed to operate the additional pixel cells.

Method

Figure 11:
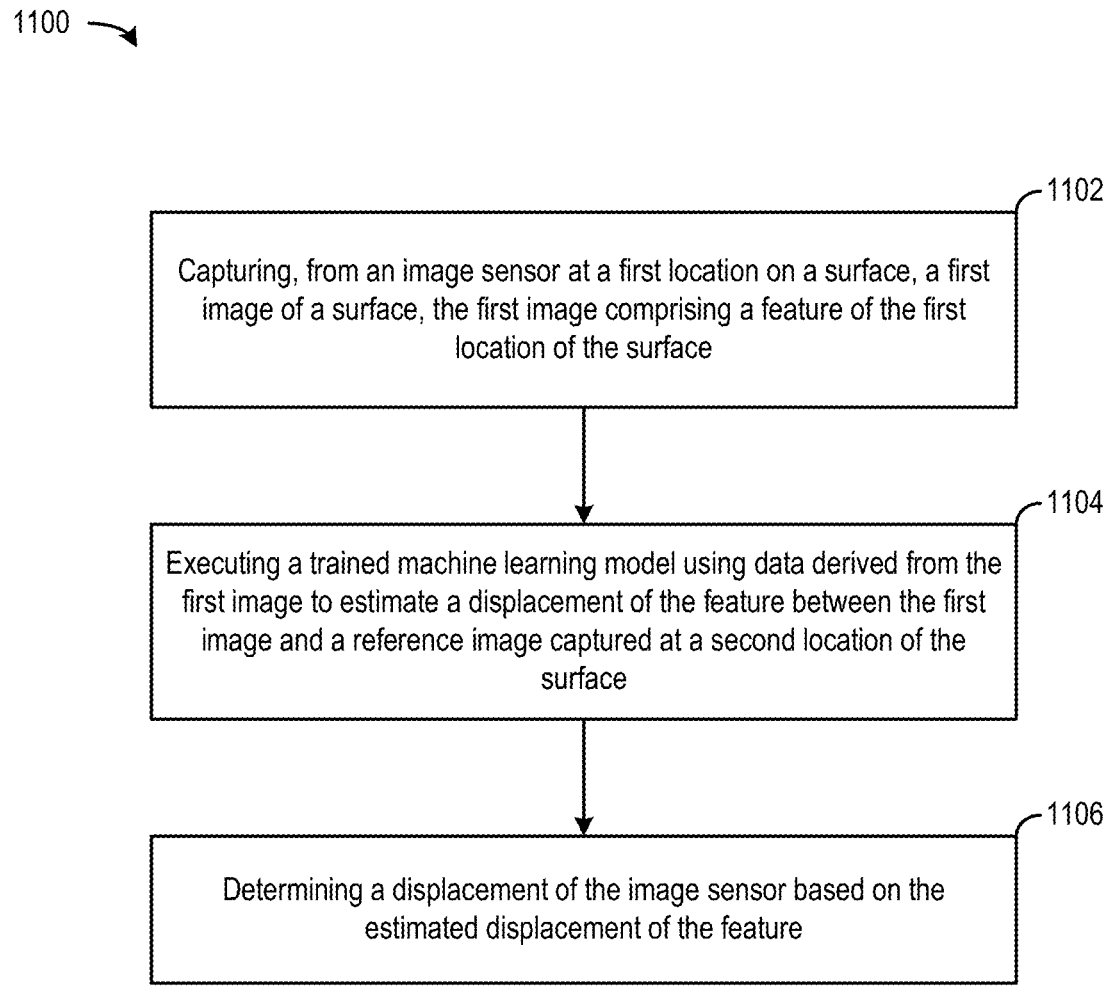
FIG. 11 illustrates a flow chart of an example method for displacement estimation.

FIG. 11 shows a simplified flow diagram of method 1100 for determining a displacement of a peripheral device. Method 1100 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1100 can be performed by displacement estimation system 500 of FIG. 5.

At step 1102, method 1100 can include capturing, from an image sensor at a first location on a surface, a first image of a surface. The first image may include a feature of the first location of the surface. The feature may include, for example, an edge, a texture, etc. The image sensor can be part of a computer mouse.

At step 1104, method 1100 can include executing a trained machine learning model using data derived from the first image to estimate a displacement of the feature between the first image and a reference image captured at a second location of the surface. In some examples, the data derived from the first image may include pixel data extracted from a predetermined search window. The data may also include a distribution of cross-correlation values, a distribution of absolute pixel value differences, etc. between the first image and the reference image with respect to different offsets. The trained machine learning model may be trained to output, for example, a sub-pixel level estimated displacement of the feature based on the pixel data of the first image, a distribution of cross-correlation values between the first image and the reference image, a distribution of absolute pixel value differences between the first image and the reference image, etc. In some embodiments, step 1104 may further include generating an estimated coarse estimate of the displacement by identifying the offset that gives rises to a peak cross-correlation value or a minimum absolute pixel value difference, and using the trained model to determine an error displacement between the coarse estimate and the actual displacement. Step 1104 may further include estimating the displacement based on the coarse estimate and the error displacement. The trained machine learning model may include, for example, an artificial neural network.

At step 1106, method 1100 can include determining a displacement of the image sensor based on the estimated displacement of the feature. For example, the displacement of the image sensor can be determined to be equal in distance but opposite in direction from the estimated displacement of the feature.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A method, comprising:
    capturing, from an image sensor at a first location on a surface, a first image of a surface, the first image comprising a feature of the first location of the surface;
    generating a comparison results array between the first image and a reference image, the comparison results array representing a distribution of comparison results between the first image and the reference image for a set of coarse displacements each having a pixel precision;
    providing the comparison results array as an input to a trained machine-learning model to refine one or more estimated displacements from the pixel precision to a subpixel precision;
    operating the trained machine-learning model to compute, based on the comparison results array as the input, an estimated displacement having the subpixel precision as an output; and
    determining a displacement of the image sensor based on the estimated displacement having the subpixel precision;
    wherein the machine learning model is trained to minimize errors between a set of displacements output by the machine learning model for a training data set comprising: a set of cross-correlation values distributions and a set of corresponding displacements; or a sum of absolute pixel value differences.

2. The method of claim 1, wherein the comparison results array represents the distribution of comparison results between the first image and the reference image with respect to the set of coarse displacements between the first image and the reference image.

3. The method of claim 2, wherein each comparison result of the distribution of comparison results is based on a sum of differences between pixels of the first image and the reference image.

4. The method of claim 1, wherein the comparison results array comprises a distribution of cross-correlation values between the first image and the reference image with respect to the set of coarse displacements between the first image and the reference image.

5. The method of claim 1, wherein the image sensor is part of a computer peripheral device positioned on the surface; and
wherein the displacement is to be provided to a computer to update content displayed by the computer.

6. The method of claim 1, wherein the comparison results array is derived from at least one of a subset of pixels of the first image or a subset of pixels of the reference image.

7. The method of claim 1, wherein the trained machine-learning model is a first trained machine learning model;
wherein the displacement is a first displacement; and
wherein the method further comprises:
providing pixel data of the first image to a second trained machine-learning model; and
operating a second trained machine learning model to perform:
computing, based on the pixel data, a cross-correlation values distribution between the first image and the reference image, the cross-correlation values distribution corresponding to a set of candidate displacements and representing the comparison between the first image and the reference image;
interpolating the set of candidate displacements based on the cross-correlation values distribution; and
estimating a second displacement based on a result of the interpolation.

8. The method of claim 1, wherein the machine-learning model comprises an artificial neural network, the artificial neural network comprising at least one of a fully connected neural network or a convolutional neural network.

9. The method of claim 1, further comprising:
selecting, based on an operation condition and from a plurality of machine-learning models, the machine-learning model.

10. The method of claim 9, wherein the operation condition comprises at least one of: a type of the surface, or a configuration of the image sensor.

11. The method of claim 1, wherein the machine-learning model is trained based on a training data set comprising:
a set of reference images;
a set of displacement images paired with the set of reference images; and
a set of displacements of a feature between the set of reference images and the set of displacement images.

12. The method of claim 1, wherein the machine-learning model is trained based on a training data set comprising:
a set of cross-correlation values between a set of reference images and a set of displacement images paired with the set of reference images; and
a set of displacements of a feature between the set of reference images and the set of displacement images.

13. A peripheral device, comprising:
an image sensor; and
a hardware processor configured to:
control the image sensor to capture a first image of a surface when the peripheral device is at a first location on the surface, the first image comprising a feature of the first location of the surface;
generate a comparison results array between the first image and a reference image, the comparison results array representing a distribution of comparison results between the first image and the reference image for a set of coarse displacements each having a pixel precision;
provide the comparison results array as an input to a trained machine-learning model to refine one or more estimated displacements from the pixel precision to a subpixel precision;
operate the trained machine-learning model to compute, based on the comparison results array as the input, an estimated displacement having the subpixel precision as an output; and
determine a displacement of the image sensor based on the estimated displacement having the subpixel precision;
wherein the machine learning model is trained to minimize errors between a set of displacements output by the machine learning model for a training data set comprising: a set of cross-correlation values distributions and a set of corresponding displacements; or a sum of absolute pixel value differences.

14. The peripheral device of claim 13, wherein the comparison results array represents the distribution of comparison results between the first image and the reference image with respect to the set of coarse displacements between the first image and the reference image.

15. The peripheral device of claim 14, wherein each comparison result of the distribution of comparison results is based on a sum of differences between pixels of the first image and the reference image.

16. The peripheral device of claim 13, wherein the comparison results array comprises a distribution of cross-correlation values between the first image and the reference image with respect to the set of coarse displacements between the first image and the reference image.

17. The peripheral device of claim 13, wherein the machine-learning model comprises an artificial neural network, the artificial neural network comprising at least one of a fully connected neural network or a convolutional neural network.

18. The peripheral device of claim 13, further comprising:
selecting, based on an operation condition and from a plurality of machine-learning models, the machine-learning model.

19. The peripheral device of claim 18, wherein the operation condition comprises at least one of: a type of the surface, or a configuration of the image sensor.

* * * * *